US012625314B2

(12) United States Patent
Vostrikov et al.

(10) Patent No.: US 12,625,314 B2
(45) Date of Patent: May 12, 2026

(54) CURVED WAVEGUIDE-BASED AUGMENTED REALITY DEVICE, METHOD FOR OPERATION OF SAID DEVICE, AUGMENTED REALITY GLASSES BASED ON SAID DEVICE

(71) Applicant: Samsung Electronics Co., Ltd., Suwon-si (KR)

(72) Inventors: Gavril Nikolaevich Vostrikov, Moscow (RU); Nikolay Viktorovich Muravyev, Podolsk (RU); Aleksandr Evgenyevich Angervaks, St. Petersburg (RU); Roman Aleksandrovich Okun, St. Petersburg (RU); Anastasia Sergeevna Perevoznikova, Izhevsk (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 18/455,257

(22) Filed: Aug. 24, 2023

(65) Prior Publication Data

US 2024/0201429 A1     Jun. 20, 2024

Related U.S. Application Data

(63) Continuation of application No. PCT/KR2023/010613, filed on Jul. 21, 2023.

(30) Foreign Application Priority Data

Dec. 19, 2022     (RU) ........................... RU2022133304

(51) Int. Cl.
| | |
|---|---|
| *F21V 8/00* | (2006.01) |
| *G02B 27/01* | (2006.01) |
| *G02B 27/42* | (2006.01) |

(52) U.S. Cl.
CPC ......... *G02B 6/0016* (2013.01); *G02B 6/0036* (2013.01); *G02B 6/0076* (2013.01); (Continued)

(58) Field of Classification Search
CPC .. G02B 27/0172; G02B 27/017; G02B 27/01; G02B 27/4216; G02B 2027/0178; (Continued)

(56) References Cited

U.S. PATENT DOCUMENTS

| | | |
|---|---|---|
| 5,870,417 A | 2/1999 | Verdiell et al. |
| 9,733,475 B1 | 8/2017 | Brown et al. |

(Continued)

FOREIGN PATENT DOCUMENTS

| | | | |
|---|---|---|---|
| CN | 105934902 A | 9/2016 | |
| CN | 110161680 A * | 8/2019 | ............. G02B 6/005 |

(Continued)

OTHER PUBLICATIONS

CN_110161680_A (English translation) (Year: 2019).*

(Continued)

*Primary Examiner* — Thomas A Hollweg
*Assistant Examiner* — Mary A El-Shammaa
(74) *Attorney, Agent, or Firm* — Jefferson IP Law, LLP

(57) ABSTRACT

A curved waveguide-based augmented reality device is provided. The device includes a projector, and a curved waveguide. The waveguide has a shape of a concentric cylindrical meniscus and includes an in-coupling diffractive optical element and an out-coupling diffractive optical element, a grating period of a diffraction grating of the in-coupling diffractive optical element at each point of the in-coupling diffractive optical element is such that rays from one point of an initial image are input into the curved waveguide in each point of the in-coupling diffractive optical element at the same angle relative to a normal to a (Continued)

surface of the curved waveguide at a point of ray incidence, and at least at one point on each of the diffractive optical elements a diffraction grating period of the in-coupling diffractive optical element is equal to a diffraction grating period of the out-coupling diffractive optical element.

15 Claims, 16 Drawing Sheets

(52) U.S. Cl.
      CPC ..... *G02B 27/0172* (2013.01); *G02B 27/4216* (2013.01); *G02B 2027/013* (2013.01); *G02B 2027/0178* (2013.01)

(58) Field of Classification Search
      CPC ...... G02B 2027/013; G02B 2027/0174; G02B 6/0076; G02B 6/0036; G02B 6/0016; G02B 5/32
      See application file for complete search history.

(56) References Cited

U.S. PATENT DOCUMENTS

| | | | |
|---|---|---|---|
| 9,778,469 | B2 | 10/2017 | Kimura et al. |
| 10,228,565 | B1 | 3/2019 | Saarikko |
| 10,585,290 | B2 | 3/2020 | Cai et al. |
| 10,690,915 | B2 | 6/2020 | Popovich et al. |
| 10,983,346 | B2 | 4/2021 | Vallius et al. |
| 11,333,893 | B1 | 5/2022 | Draper et al. |
| 11,609,425 | B2 | 3/2023 | Ahn |

| | | | |
|---|---|---|---|
| 2003/0169787 | A1 | 9/2003 | Vurgaftman et al. |
| 2012/0300311 | A1 | 11/2012 | Simmonds et al. |
| 2016/0291328 | A1 | 10/2016 | Popovich et al. |
| 2017/0184857 | A1 | 6/2017 | Ato et al. |
| 2018/0292676 | A1 | 10/2018 | Alexander |
| 2019/0072767 | A1 | 3/2019 | Vallius et al. |
| 2022/0113552 | A1 | 4/2022 | Schowengerdt |

FOREIGN PATENT DOCUMENTS

| | | | | |
|---|---|---|---|---|
| GB | 2598946 A | 3/2022 | | |
| KR | 10-2223621 B1 | 3/2021 | | |
| RU | 2 632 257 C2 | 10/2017 | | |
| RU | 2 654 360 C2 | 5/2018 | | |
| WO | 03/076976 A2 | 9/2003 | | |
| WO | 2008/020899 A2 | 2/2008 | | |
| WO | 2015/081313 A2 | 6/2015 | | |
| WO | 2015/081313 A9 | 6/2015 | | |
| WO | WO-2020136306 A1 * | 7/2020 | ......... | G02B 27/4205 |
| WO | WO-2020232170 A1 * | 11/2020 | ......... | G02B 27/0172 |
| WO | 2021/098744 A1 | 5/2021 | | |
| WO | 2021/219516 A1 | 11/2021 | | |
| WO | 2022/058740 A1 | 3/2022 | | |

OTHER PUBLICATIONS

Edward Dehoog et al, "Field of View of Limitations in See-Through head-mounted display (HMD) Using Geometric Waveguides", Applied Optics, vol. 55, No. 22, Aug. 1, 2016.
International Search Report dated Oct. 23, 2023, issued in International Patent Application No. PCT/KR2023/010613.

* cited by examiner

CURVED WAVEGUIDE-BASED AUGMENTED REALITY DEVICE, METHOD FOR OPERATION OF SAID DEVICE, AUGMENTED REALITY GLASSES BASED ON SAID DEVICE

CROSS-REFERENCE TO RELATED APPLICATION(S)

This application is a continuation application, claiming priority under § 365(c), of an International application No. PCT/KR2023/010613, filed on Jul. 21, 2023, which is based on and claims the benefit of a Russian patent application number 2022133304, filed on Dec. 19, 2022, in the Russian Intellectual Property Office, the disclosure of which is incorporated by reference herein in its entirety.

TECHNICAL FIELD

The disclosure relates to augmented reality devices. More particularly, the disclosure relates to augmented reality glasses.

BACKGROUND OF INVENTION

Wearable augmented reality glasses (AR) are a personal device that a user can use as a source of video information (image) projected directly into the user eye in the form of a virtual image that complements a user surrounding real world. For mass-market consumer, it is necessary to develop devices of augmented reality glasses with a wide field of view (FOV) is angular characteristic showing in what range of angles it is possible to observe virtual images that complement the user surrounding real world), a low-weight and low-cost, compactness and high resolution. Such wearable devices can replace any source of video information for the user, such as (televisions) TVs, smartphones, etc.

The following requirements are imposed on systems of augmented reality glasses:
- a wide field of view to enable overlapping a virtual image on a large area of space that the human eye sees;
- good image quality, i.e., high resolution, high contrast, etc.;
- low weight;
- compactness;
- low cost.

An optical device that combines a virtual image with the user surrounding real world is an optical combiner. As a combiner, planar (flat) waveguides are currently most widely used, on the surface of which diffractive optical elements (DOEs) for inputting, conversing and outputting optical radiation are located. A planar waveguide is a transparent plate made of an optical material with two planeparallel surfaces. A beam of parallel rays can propagate without distortions to any distance within such a waveguide. Augmented reality devices with such combiners have low weight, small size, low cost, can provide a wide field of view, and have high transmissivity, that is, high transmission of a real image.

However, in such devices, the edges where image projectors are located are disposed far from temporal part of the user head, so such glasses occupy a large space during use. In addition, such combiners form a virtual image not only from the side where the user eye is located, but also from the opposite side from the user. This may lead to that an external observer, at a certain location, will be able in the same manner as the user to partially or completely see the virtual image formed for the user, which may be undesirable.

Curved waveguides located on the user head such that they go around the oval of the user head can be used as an optical combiner, wherein the glasses with such a combiner will be more compact and convenient, they will have smaller dimensions, a device with such a combiner will be more ergonomic and aesthetic. However, the use of a curved waveguide as a combiner is associated with significant difficulties in converting and transmitting optical radiation therethrough.

For example, let is consider the case of falling a parallel beam of rays on a curved waveguide. Let this beam be input into the waveguide using a constant-period in-coupling diffraction grating. The beam of parallel rays falling (incident) on the waveguide will turn into a non-parallel beam inside the waveguide, the rays of which will propagate at different angles within the waveguide. This effect should be taken into account and compensated for when designing augmented reality glasses with a curved combiner.

A document U.S. Ser. No. 10/983,346B2 (publication date is 20.04.2021) is known from prior art. This document discloses a curved waveguide-based display device, wherein a portion of the waveguide for inputting radiation is flat and a portion of the waveguide for outputting radiation is curved. On the curved portion of the waveguide, an out-coupling diffractive optical element (DOE) with a variable period is disposed, wherein all the radiation entering the waveguide from a projector is output based on the out-coupling DOE at one angle, that is, all the rays that are output from the waveguide are parallel each other, so that an image has no distortions. The disadvantage of the known device is the low quality of the image formed by such a combiner due to that a parallel beam of rays propagating without distortions within the flat portion of the waveguide, having passed into the curved portion of the waveguide, will be inevitably distorted when propagating along the curved portion of the waveguide because the angle of incidence of various rays from the parallel beam on the curved surface of the waveguide will be different due to curvature of this surface.

A document "Field of View of Limitations in See-Through head-mounted display (HMD) Using Geometric Waveguides" published in "Applied Optics" Journal in 2016, Authors—Edward Dehoog, Jason Holmstedt, and Tin Aye, is known from prior art. Limitations of the field of view in the case of using a concentric meniscus as a combiner compared to a flat combiner have been considered in this article. A concentric meniscus is an optical detail formed by two spherical surfaces whose curvature centers are at one point. In addition, it is shown that each ray propagating within the concentric meniscus will have the same angles of incidence and reflection at each point of the ray incidence on the outer surface of the waveguide relative to a normal at each point of incidence. For the inner surface of the waveguide, the angles of incidence and reflection relative to the normal at each point of the ray incidence will also be the same, but different in value from the angles for the outer surface.

A device disclosed in a document WO 2022058740 A1 (publication date is 24.03.2022) is a closest prior art to the disclosure. A combiner as a curved waveguide is used in the device. The curved waveguide is a cylindrical concentric meniscus. The cylindrical concentric meniscus is an optical detail whose surfaces are formed by cylindrical surfaces, wherein the axes of the cylinder surfaces of the waveguide coincide. A radiation source in the disclosure is located on the axis of the cylindrical surfaces of the waveguide. An in-coupling DOE has a constant period. An additional cylindrical focusing lens, the axes of the cylindrical surfaces of which are perpendicular to the axis of the cylindrical surfaces of the waveguide, is installed between the radiation source that is projected into the user eye and the in-coupling DOE. In such an arrangement, each ray incident from the radiation source, which is disposed on the axis of the waveguide cylinder, on the in-coupling DOE will coincide with the direction of the normal to the waveguide surface at the point of incidence. Therefore, each ray from the radiation source will be input into the waveguide by the in-coupling DOE at the same angle. A beam of such rays will propagate within the waveguide in the form of a concentric cylindrical meniscus for any distance while maintaining the angles of incidence and reflection relative to the normals at the points of incidence on the inner and outer sides of the waveguide, that is, without distortions. This will allow this beam to be output using the out-coupling DOE from the waveguide, thus having formed an image for the user. The proposed arrangement allows an aberration-free image of points located on the axis of the cylindrical surfaces of the waveguide in the case of zero aberrations of the additional cylindrical focusing lens to be formed. The disadvantage of this arrangement is its bulkiness due to the requirements for location of the radiation source relative to the waveguide.

The proposed solutions allow creating a compact augmented reality device with a curved combiner that forms a quality image for the user that cannot be observed by an outsider.

The above information is presented as background information only to assist with an understanding of the disclosure. No determination has been made, and no assertion is made, as to whether any of the above might be applicable as prior art with regard to the disclosure.

SUMMARY OF INVENTION

Aspects of the disclosure are to address at least the above-mentioned problems and/or disadvantages and to provide at least the advantages described below. Accordingly, an aspect of the disclosure is to provide augmented reality devices and augmented reality glasses.

Additional aspects will be set forth in part in the description which follows and, in part, will be apparent from the description, or may be learned by practice of the presented embodiments.

In accordance with an aspect of the disclosure, an augmented reality display device is provided. The augmented reality display device includes a projector forming an initial image, a curved waveguide having the shape of a concentric cylindrical meniscus and comprising an in-coupling diffractive optical element and an out-coupling diffractive optical element, wherein a grating period (groove period) of the in-coupling diffractive optical element at each point of the in-coupling diffractive optical element is such that rays emanating from one point of the initial image undergo diffraction at the in-coupling diffractive optical element at the same angle relative to the normal to a surface of the curved waveguide at a point of incidence, wherein the curved waveguide is configured to propagate the rays of the initial image from the in-coupling diffractive optical element to the out-coupling diffractive optical element based on total internal reflection from surfaces of the curved waveguide, wherein, when propagating the rays of the initial image, angles of incidence on and of reflection from a concave surface of the curved waveguide within the curved waveguide are equal to each other and constant, and angles of incidence on and of reflection from a convex surface of the curved waveguide within the curved waveguide are equal to each other and constant, wherein the out-coupling diffractive optical element is configured to form a virtual image on a user retina by converting the rays passed through the curved waveguide and falling on the out-coupling diffractive optical element into parallel beams of rays.

Meanwhile, at least at one point on each of the diffractive optical elements a diffraction grating period of the in-coupling diffractive optical element may be equal to a diffraction grating period of the out-coupling diffractive optical element. In one of embodiments of the disclosure, the diffraction grating period of the in-coupling diffractive optical element is equal to the diffraction grating period of the out-coupling diffractive optical element in the center of the in-coupling diffractive optical element and in the center of a diffraction grating of the out-coupling diffractive optical element, wherein the center of the initial image lies on the normal to the waveguide surface in the center of the in-coupling diffractive optical element, and the center of an image formed by the out-coupling diffractive optical element lies on the normal to the waveguide surface in the center of the out-coupling diffractive optical element.

In yet another embodiment of the disclosure, if the projector forms the image at infinity, for each point of the in-coupling diffractive optical element with coordinates $x_{in}$ and $L_{in}$ its period is defined by the expression:

$$T^{IN}(x_{in}, L_{in}) = \frac{\lambda}{\sin\left(\dfrac{L_{in}}{R1}\right) + \dfrac{\lambda}{T_0}},$$

$x_{in}$ is a linear coordinate of the point on the waveguide surface on which the ray falls along the $O_{in}X_{in}$ axis in a coordinate system $O_{in}X_{in}Y_{in}Z_{in}$, wherein the center $O_{in}$ of the coordinate system is disposed at the center of the in-coupling diffractive optical element, the $Z_{in}$ axis is directed along the normal to the surface of the curved waveguide, the Yin axis is directed tangentially to the surface of the curved waveguide in the point $O_{in}$ along the length of the curved waveguide and perpendicularly to the $Z_{in}$ axis, the $X_{in}$ axis is directed along the generatrix of the cylindrical surface of the curved waveguide in the point $O_{in}$ across the width of the curved waveguide and perpendicularly to the $Z_{in}$ axis, $L_{in}$ is a linear coordinate along the concave surface of the curved waveguide with the origin in the center $O_{in}$ of the in-coupling diffractive optical element, R1 is a curvature radius of the concave surface of the curved waveguide, $\lambda$ is an incident radiation wavelength, $T_0$ is a diffraction grating period of the in-coupling diffractive optical element in the point where ray with a wavelength A falling on the in-coupling diffractive optical element along the normal to the surface of the curved waveguide undergoes diffraction into a $-1^{st}$ diffraction order by the in-coupling diffractive optical element, wherein the grooves (grating groove) of the in-coupling diffractive optical element are parallel to the common axis of the cylindrical surfaces of the curved waveguide.

If the out-coupling diffractive optical element forms the image at infinity, a variation of the period of the out-coupling diffractive optical element can be equal to:

$$T_{YOZ}^{OUT}(L_{out}) = \frac{\lambda}{\ldots \sin(L_{out}/R1) + \lambda/T_0},$$

$L_{out}$ is a linear coordinate along the concave surface of the curved waveguide in a cross-section $Y_{out}O_{out}Z_{out}$ with the origin in the center $O_{out}$ of the out-coupling diffractive optical element, where the period of the out-coupling diffractive optical element is equal to $T_0$, the $Z_{out}$ axis is directed along the normal to the surface of the curved waveguide, the $Y_{out}$ axis is directed tangentially to the surface of the curved waveguide in the point $O_{out}$ along the length of the curved waveguide and perpendicularly to the $Z_{out}$ axis, the $X_{out}$ axis is directed tangentially to the surface of the curved waveguide in the point $O_{out}$ across the width of the curved waveguide and perpendicularly to the $Z_{out}$ axis, R1 is a curvature radius of the concave surface of the curved waveguide, $\lambda$ is an incident radiation wavelength, wherein the grooves (grating grooves) of the out-coupling diffractive optical element are parallel to the common axis of the cylindrical surfaces of the curved waveguide.

Meanwhile, the device may further comprise two flat waveguides disposed between the projector and the in-coupling diffractive optical element, wherein each of the flat waveguides has a constant-period diffraction grating of the flat waveguide, wherein grooves of the diffraction grating of each flat waveguide are perpendicular to the axis of the cylindrical surfaces of the curved waveguide.

In accordance with another aspect of the disclosure, a method for operating an augmented reality device is provided. The method includes forming, by a projector, an initial image, inputting, by an in-coupling diffractive optical element, rays of an initial image into a curved waveguide, wherein rays emanating from one point of the initial image undergo diffraction at the in-coupling diffractive optical element at the same angle relative to the normal to a surface of the curved waveguide at a point of incidence, the rays inputted into the curved waveguide propagate within the curved waveguide by means of total internal reflection from surfaces of the curved waveguide, transforming, by means of the out-coupling diffractive optical element, the rays passed through the curved waveguide into parallel beams of rays to form a virtual image on a user retina.

In accordance with another aspect of the disclosure, augmented reality glasses are provided. The augmented reality glasses include an element for left eye and an element for right eye, wherein each of the elements for left and right eye is the proposed augmented reality display device. Meanwhile, a distance between the centers of the out-coupling diffractive optical elements may correspond to a user inter-pupillary distance. Meanwhile, the normal to the waveguide surface in the center of the out-coupling diffractive optical element for right eye may be parallel to the normal to the waveguide surface in the center of the out-coupling diffractive optical element for left eye.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION OF INVENTION

Figure 1A:
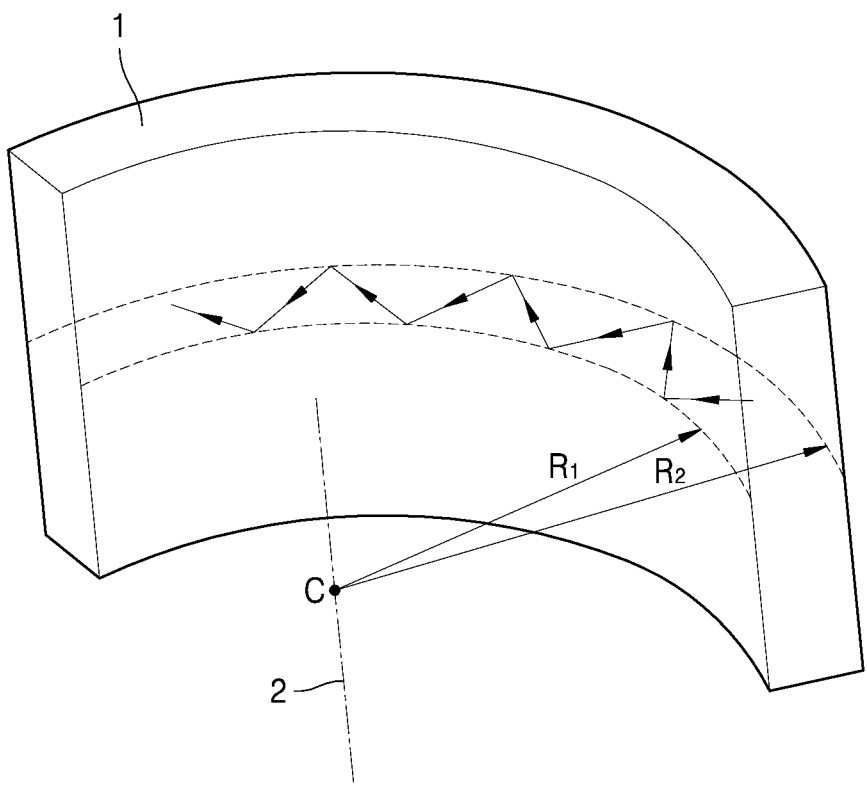
FIG. 1A illustrates a curved waveguide in isometry according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An augmented reality device based on a curved optical combiner is proposed. The disclosure allows a user to see a distortion-free image at any width of a radiation beam entering from a projection system. The disclosure also provides a wide field of view for a user and is a compact device. When employing the proposed device, improved image quality is provided, which is maintained in a wide range of the user eye position relative to the optical combiner.

The following terms are used when describing the disclosure:

A virtual image is an imaginary image obtained by extensions of rays that do not converge in the object space. The essence of the virtual image for use in augmented reality devices consists in that such an image is to be imaginary, otherwise the user will not see it. A real image is a virtual image of physically existing objects.

An optical combiner is an optical device providing the formation of an image in front of the user that complements the user surrounding real world (virtual image), while not interfering with the user observation of the surrounding real world. In the application, a curved waveguide as a concentric cylindrical meniscus is used as an optical combiner, the waveguide having an in-coupling diffractive optical element (DOE) and an out-coupling DOE, whose centers are located in the same plane perpendicular to the axis of the cylindrical surfaces of the waveguide.

A field of view (FOV) of an optical system (angular field) is an angular range within which a user can observe an image formed by the optical system. The center of the field of view corresponds to the center of the image, and the edge of the field of view corresponds to the edge of the maximum possible size of the image.

Eye motion box (EMB) is an area within which the eye, when moving, can see a total field of view formed by an augmented reality device without losses and with predetermined quality. Eye motion box is a linear area in space within which the total field of view enters the eye pupil, i.e., rays from any point of an image. Outside this area, a part of the field of view is lost partially or completely, i.e., outside this area, the rays from the entire virtual image or some part thereof do not enter the entrance pupil of the eye. The eye is constantly moving, rotating and at the same time the eye pupil is constantly displacing. The eye motion box of an optical combiner of the augmented reality device should correspond to the range of possible motion of the user eye.

An exit pupil (or a pupil of an optical system) is a paraxial image of an aperture diaphragm in image space, formed by the following part of the optical system in a ray forward path. This term is well-established in optics. The main property of the exit pupil is that at any point thereof there are rays forming the total field of view. In waveguide optics, technical solutions are known for multiplying the exit pupil, that is, increasing its size, without increasing size of an optical system in the direction of an optical axis. Classical optics allows size of the exit pupil to be increased, but at the same time, size of the optical system increases significantly, whereas waveguide optics, due to the multiple reflection of beams of rays inside the waveguide, allows doing this without increasing size in the direction of the optical axis of the optical system.

A concentric meniscus is an optical detail formed by two spherical waveguide surfaces, whose curvature centers are at one point.

FIG. 1A illustrates a curved waveguide in isometry according to an embodiment of the disclosure.

Figure 1B:
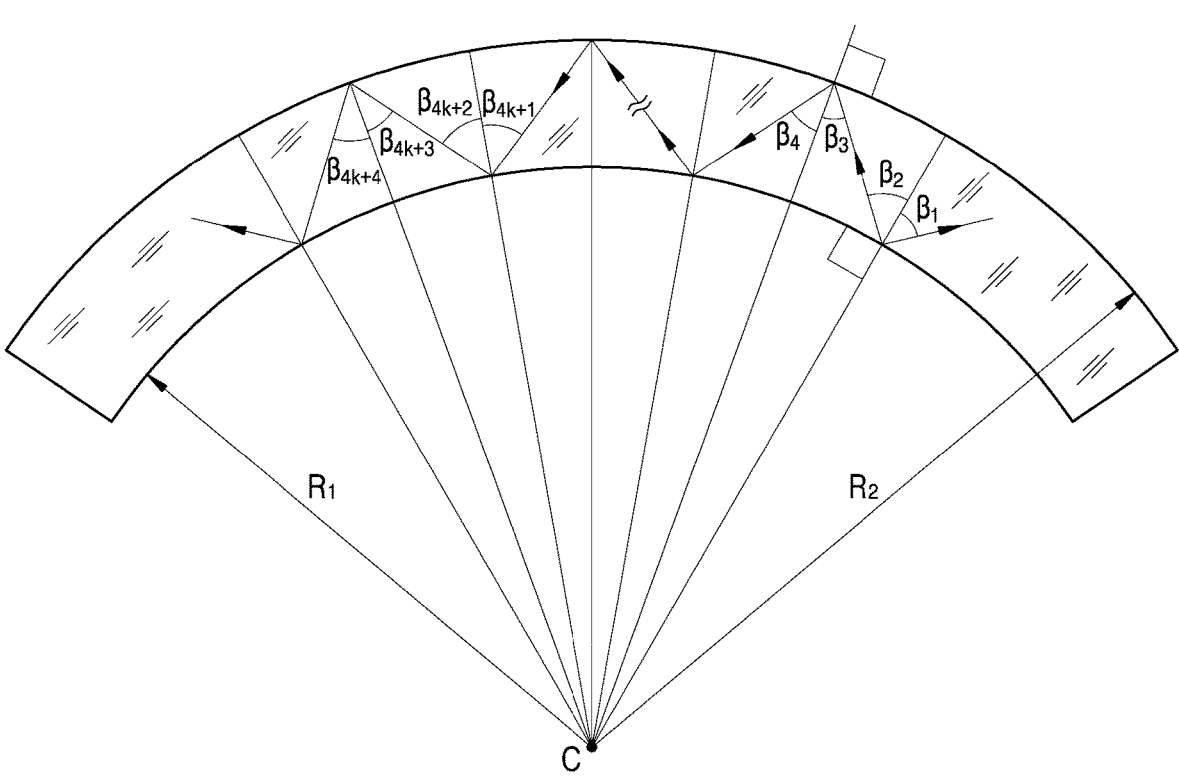
FIG. 1B illustrates ray propagation at total internal reflection (TIR) angles within a curved waveguide in a plane perpendicular to its axis according to an embodiment of the disclosure.

FIG. 1B illustrates ray propagation at total internal reflection (TIR) angles within a curved waveguide in a plane perpendicular to its axis according to an embodiment of the disclosure.

Referring to FIGS. 1A and 1B, a concentric cylindrical meniscus (curved waveguide 1) is an optical detail formed by two cylindrical surfaces whose axes coincide, as shown in FIG. 1A. The common axis of the concave and convex cylindrical surfaces of the curved waveguide is denoted by reference number 2.

Let is consider propagation of a beam within concentric cylindrical meniscus (curved waveguide) in a cross-section plane perpendicular to the axis 2 of the cylindrical surfaces forming it. The beam path in this plane is shown in FIG. 1A in isometry and in FIG. 1B in the plane of such a cross-section. The point C in FIG. 1B is the point of intersection of the cross-section plane under consideration and the common axis 2 of the surfaces of the waveguide 1.

In this cross-section plane, the concentric cylindrical meniscus will be represented by two arcs of circles limiting the internal volume of the curved waveguide whose centers coincide at the point C, as shown in FIG. 1B. The normals to the convex and concave surfaces at all points of such a cross-section of the waveguide will lie in the same cross-section plane.

For a beam propagating within such a waveguide at a TIR (total internal reflection) angle in this cross-section plane, the angle of incidence and reflection will be constant for the concave $\beta_1 = \beta_1 = \beta_2 = \beta_{4k+1} = \beta_{4k+2}$ and opposite (convex) surfaces of the waveguide $\beta_{II} = \beta_3 = \beta_4 = \beta_{4k+3} = \beta_{4k+4}$ at k=1, 2, 3, 4 . . . . This is true for a waveguide of this shape due to that the radii of curvature of the convex surface $R_2$ and the concave surface $R_1$ have the same center, i.e., the point C, and the normals to the outer and inner surfaces of the waveguide lie in the same cross-section plane. Angles of ray incidence for concave (first surface) and convex (second surface) surfaces are related by the relationship: $\beta_1 = -\arcsin(\sin(\beta_{II}) \cdot R_2 / R_1)$.

Rays that do not lie in the plane perpendicular to the axis 2 of the cylindrical surfaces of the waveguide will propagate within the waveguide along such a trajectory that its projection onto the plane perpendicular to the axis 2 of the cylindrical surfaces of the waveguide will correspond to FIG. 1B. For such rays, the equality of the angles of incidence and reflection of the ray relative to the normal to the waveguide surface at each point of incidence for the inner and outer surfaces of the waveguide will also be maintained.

Such properties of ray propagation within a concentric cylindrical meniscus, i.e., maintaining the angle of incidence and reflection relative to the normal at all points of incidence for the concave and convex surface, are used in the disclosure to form a virtual image using a curved combiner. A beam of rays propagating within a concentric cylindrical meniscus in the range of TIR angles, as shown in FIG. 1B, which have equal angles of incidence and reflection relative to the normal at the point of incidence for the concave and convex surface, can transmit the brightness of one direction of the field of view from a region of the in-coupling DOE (diffractive optical element) to a region of the out-coupling DOE through the curved waveguide. Such a beam of rays has the following particulars:

it propagates within the waveguide to any distance in the range of TIR angles while maintaining the ray angles relative to the normals at the points of incidence;

it is not a homocentric beam, that is, the extensions of the rays of such a beam do not intersect at one point;

it is a divergent beam when propagating from the concave surface of the waveguide to the convex surface;

it is a converging beam when propagating from the convex surface of the waveguide to the concave surface.

In order to form such a beam inside the waveguide, the in-coupling DOE should appropriately transform the beam falling thereon from a radiation source that constitutes the image that is presented to the user. To do this, each ray of said radiation beam should undergoes diffraction such that the angle of the beam diffracted inside the waveguide relative to the normal to the waveguide surface should be equal for each such ray for all points of incidence on the in-coupling DOE.

A projector is generally a radiation source with an optical system. The optical system of the projector builds an image of the radiation source at some distance from the projector, usually at infinity. The radiation source that builds the initial image can be divided into point radiation sources located at some distance from the curved waveguide. Further, the following options for the location of one point radiation source will be considered a) a point radiation source is at a finite distance from the concave surface of the curved waveguide 1, b) a point radiation source is on the axis of the cylindrical surfaces of the curved waveguide 1, c) a point radiation source is at infinity, it is a projector in practical implementation whose lens transfers the image of the radiation source to infinity, this option is interesting in view of practical application.

Let is locate the origin of a coordinate system in the point of the in-coupling DOE, where a ray from a point radiation source falls on the concave surface $1a$ of the waveguide along the normal (point $O_{in}$), the $Z_{in}$ axis in the direction of the normal to the waveguide surface at the point $O_{in}$, let is locate the Yin axis in the plane of the cross-section under consideration, along tangentially to the surface of the curved waveguide at the point $O_{in}$ along the length of the curved waveguide and perpendicularly to the $Z_{in}$ axis, and the $X_{in}$ axis perpendicular to the plane of the cross-section under consideration is directed along the generatrix of the cylindrical surface of the curved waveguide at the point $O_{in}$ and perpendicularly to the $Z_{in}$ axis. Let is also introduce a linear coordinate system $L_{in}$ on the curvilinear surface of the waveguide in the cross-section under consideration also with the origin in the point $O_{in}$. $L_{in}$ is a linear coordinate along the concave surface of the waveguide, the origin is in the center of the in-coupling DOE at the point $O_{in}$.

Figure 2:
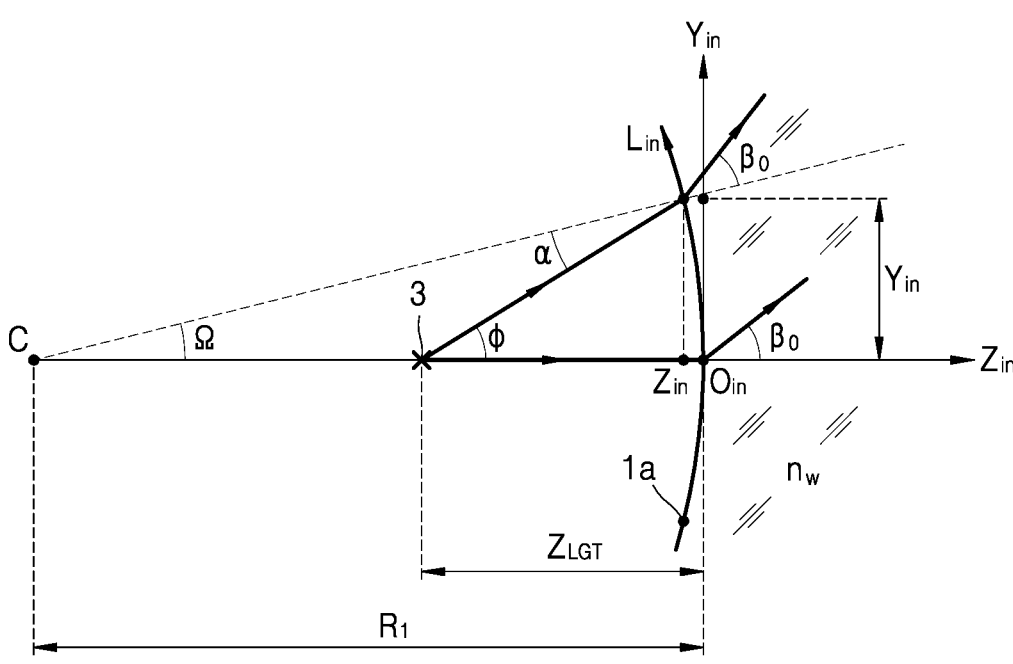
FIG. 2 illustrates a diffraction scheme of ray from a point radiation source on an in-coupling DOE in a cross-section $Y_{in}O_{in}Z_{in}$ according to an embodiment of the disclosure.

Let is consider the general case (a) of a point radiation source 3 located at a finite distance $Z_{LGT}$ from the concave surface 4 of the waveguide 1, as shown in FIG. 2.

FIG. 2 illustrates a diffraction scheme of ray from a point radiation source on an in-coupling DOE in a cross-section $Y_{in}O_{in}Z_{in}$ according to an embodiment of the disclosure.

Referring to FIG. 2, 3 is presentation of a radiation source, $1a$ is a concave surface of a waveguide, C is a center of the waveguide curvature, φ is an angle of a ray under consideration from the source relative to a $O_{in}Z_{in}$ axis; Ω is an angle between a point of incidence of the ray on the waveguide and the direction of the axis $O_{in}Z_{in}$ from the center of curvature of the waveguide C, uniquely related to a linear coordinate $L_{in}$ on the concave surface of the waveguide, α is an angle of incidence of the ray relative to the normal to the waveguide surface at the point of incidence, $y_{in}$, $z_{in}$ are coordinates of the waveguide surface point on which the ray falls in a coordinate system $O_{in}X_{in}Y_{in}Z_{in}$. $n_w$ is refractive index of the waveguide are denoted.

With this location, the radiation source 3 will form a diverging homocentric beam that will fall on the region of the in-coupling DOE. This case in a plane perpendicular to the axis of the cylindrical surfaces of the waveguide is illustrated by FIG. 2. Let a ray with a wavelength λ falling on the in-coupling DOE along the normal to the surface of waveguide 1 at the point $O_{in}$ undergoes diffraction into $-1^{st}$ order on the in-coupling DOE at angle $\beta_0$, wherein the in-coupling DOE at this point has a period $T_0$.

In order for each ray from the point source under consideration is diffracted by the in-coupling DOE at the same angle $\beta_0$ relative to the normal at the point of incidence, it is necessary that the period of the in-coupling DOE in the cross-section under consideration satisfies the relationship:

$$T_{YOZ}^{IN}(L_{in}) = \cfrac{\lambda}{\sin\left(\tan^{-1}\left(\cfrac{R1 \cdot \sin\left(L_{in}/R1\right)}{Z_{LGT} - R1 \cdot \cos\left(L_{in}/R1\right) + R1}\right) + \cfrac{L_{in}}{R1}\right) + \cfrac{\lambda}{T_0}},$$

where R1 is a curvature radius of the concave surface of the waveguide.

If the above condition is not satisfied, then the rays will be input into the curved waveguide at different angles, and on the side of the out-coupling DOE, it will be impossible to understand which rays from which point of the image fall on one or another point of the out-coupling DOE, i.e., in this case a high-quality image will be impossible to be formed.

Figure 3:
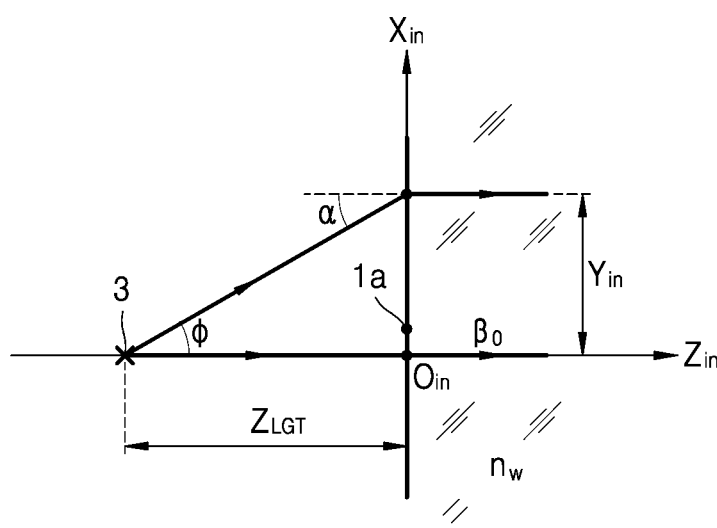
FIG. 3 illustrates a diffraction scheme of ray from a point radiation source on an in-coupling DOE in a cross-section $X_{in}O_{in}Z_{in}$ according to an embodiment of the disclosure.

FIG. 3 illustrates a diffraction scheme of ray from a point radiation source on an in-coupling DOE in a cross-section $X_{in}O_{in}Z_{in}$ according to an embodiment of the disclosure.

Referring to FIG. 3, let is consider propagation of rays in the plane $X_{in}O_{in}Z_{in}$. In this plane, the cross-section of the curved waveguide is straight lines because the axis of the waveguide cylinders also lies in this plane, as shown in FIG. 3. All rays from the point source 3 in this projection should enter the curved waveguide at a zero angle relative to the normal at the point of incidence in order to form a beam inside the waveguide of the selected configuration. To do this, the period of the in-coupling DOE in the cross-section $X_{in}O_{in}Z_{in}$ should satisfy the relationship:

$$T_{XOZ}^{IN}(x_{in}) = \cfrac{\lambda}{\left(\sin\left(\tan^{-1}\left(x_{in}/Z_{LGT}\right)\right)\right)},$$

11 | 12 where $x_{in}$ is a linear coordinate of the point of the waveguide surface on which the ray falls along the $O_{in}X_{in}$ axis in a coordinate system $O_{in}X_{in} Y_{in}Z_{in}$.

In a general form, for each point of the in-coupling DOE with the coordinates $x_{in}$ and $L_{in}$ the period is determined as follows:

$$T^{IN}(x_{in}, L_{in}) = \frac{1}{\sqrt{\left(\frac{1}{T^{IN}_{XOZ}(x_{in})}\right)^2 + \left(\frac{1}{T^{IN}_{YOZ}(L_{in})}\right)^2}}$$

According to this expression, the period of the in-coupling DOE for each point of the in-coupling DOE with coordinates $x_{in}$ and $L_{in}$ is selected such that all rays emanating from one point of the initial image undergo diffraction on the in-coupling diffractive optical element at the same angle relative to the normal to the surface of the curved waveguide at the point of incidence.

A particular case (b) of the proposed structure of the in-coupling DOE is a scheme proposed in the document WO 2022058740 A1 (publication date is 24.03.2022), when $Z_{LGT}=-R1$, i.e., a radiation source is located on the axis of the cylindrical surfaces of the waveguide, and a cylindrical lens is installed between the source and the in-coupling DOE, which lens has zero optical power in a cross-section $Y_{in}O_{in}Z_{in}$ and transfers the image of the radiation source in a cross-section of the plane $X_{in}O_{in}Z_{in}$ to infinity. In this case, the in-coupling DOE is a constant-period $T_0$ diffraction grating with grooves parallel to the $O_{in}X_{in}$ axis, that is, $$T^{IN}_{XOZ}(x_{in}) = \infty \text{ and } T^{IN}_{YOZ}(L_{in}) = T_0.$$

Another important particular case (c) is the location of the radiation source forming an initial image at infinity. In view of practical application, this is the most common case because small-sized projectors used in wearable augmented reality devices as a radiation source, as a rule, form an image at infinity. In this case $Z_{LGT}=-\infty$, and a beam falling on the in-coupling DOE from each direction of the field of view is a parallel beam. In this case $$T^{IN}_{XOZ}(x_{in}) = \infty,$$

and $$T^{IN}(x_{in}, L_{in}) = T^{IN}_{YOZ}(L_{IN}) = \frac{\lambda}{\sin\left(\frac{L_{in}}{R1}\right) + \frac{\lambda}{T_0}} \qquad \text{Expression 1}$$

The Expression 1 implements the period variation expression for the in-coupling DOE at each point of the in-coupling DOE, wherein such period variation provides the same diffraction angle at the in-coupling DOE relative to the normal to the surface of the curved waveguide at the point of incidence for the rays emanating from one point of an initial image in the case when the projector forms an image (presentation of a radiation source) at infinity.

In this case, the in-coupling DOE is a diffraction grating, whose grooves are parallel to the axis of the cylindrical surfaces of the waveguide because $$T^{IN}_{XOZ}(x_{in}) = \infty,$$

and the grating period in the plane perpendicular to the axis of the cylindrical surfaces of the curved waveguide varies according to the above Expression 1. Such a case of location of the in-coupling DOE is shown in isometry in FIG. 5.

Figure 4:
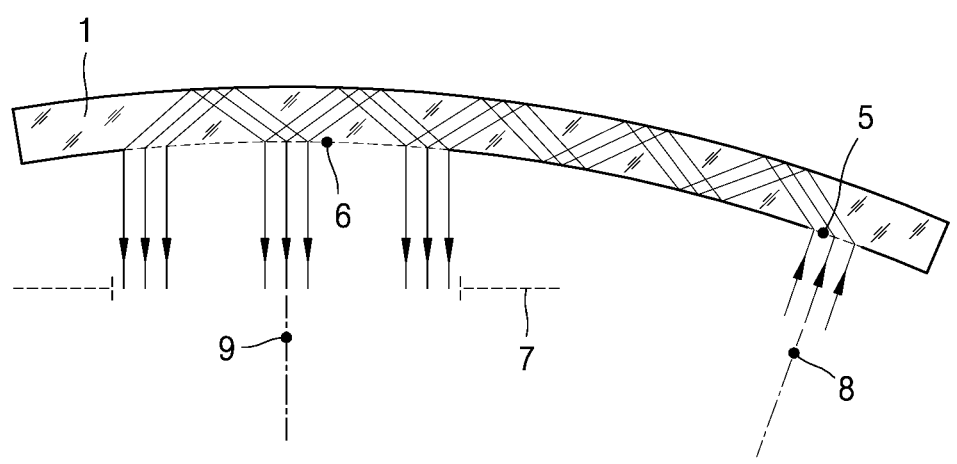
FIG. 4 illustrates a path of rays of a parallel beam falling on an in-coupling DOE 5, whose period varies in accordance with Expression 1, in a plane perpendicular to an axis of a cylindrical surfaces of a curved waveguide according to an embodiment of the disclosure.

FIG. 4 illustrates a path of rays of a parallel beam falling on an in-coupling DOE 5, whose period varies in accordance with Expression 1, in a plane perpendicular to an axis of a cylindrical surfaces of a curved waveguide of the proposed combiner according to an embodiment of the disclosure.

Referring to FIG. 4, it illustrates a combiner comprising the curved waveguide 1, the in-coupling DOE 5, and in addition an out-coupling DOE 6 for forming an image is placed further downstream along the ray path at the opposite end of the waveguide 1. Due to the partial output of the rays many times reflected in the waveguide 1, at several points on the surface of the out-coupling DOE 6, an eye motion box 7 extended in the direction of propagation of the rays is formed, which is conditionally shown by a dotted line in the form of a diaphragm 7, which limits the eye motion box, as shown in FIG. 4. When the user eye is located within the motion box indicated by the arrow, the image will be formed on the user eye retina, wherein the center of the image field is located on an axis coinciding with the normal to the surface of the curved waveguide in the center of the out-coupling diffractive optical element.

In order to form an image at infinity in front of the user, as shown in FIG. 4, the out-coupling DOE 6 can also have a variable period according to the relationship:

$$T^{OUT}_{YOZ}(L_{out}) = \frac{\lambda}{... \sin\left(L_{out}/R1\right) + \lambda/T_0}, \qquad \text{Expression 2}$$

where Lout is a linear coordinate along the inner surface of the waveguide in a cross-section YoutOoutZout, wherein the origin is in the center Oout of the out-coupling DOE 6. Meanwhile, the center Oout of the coordinate system is disposed at the center of the out-coupling DOE, where the period of the out-coupling DOE is equal to T0, the Zout axis is directed along the normal to the surface of the curved waveguide, the Yout axis is directed tangentially to the surface of the curved waveguide in the point Oout along the length of the curved waveguide and perpendicularly to the Zout axis, the Xout axis is directed tangentially to the surface of the curved waveguide in the point Oout across the width of the curved waveguide and perpendicularly to the Zout axis.

Figure 5:
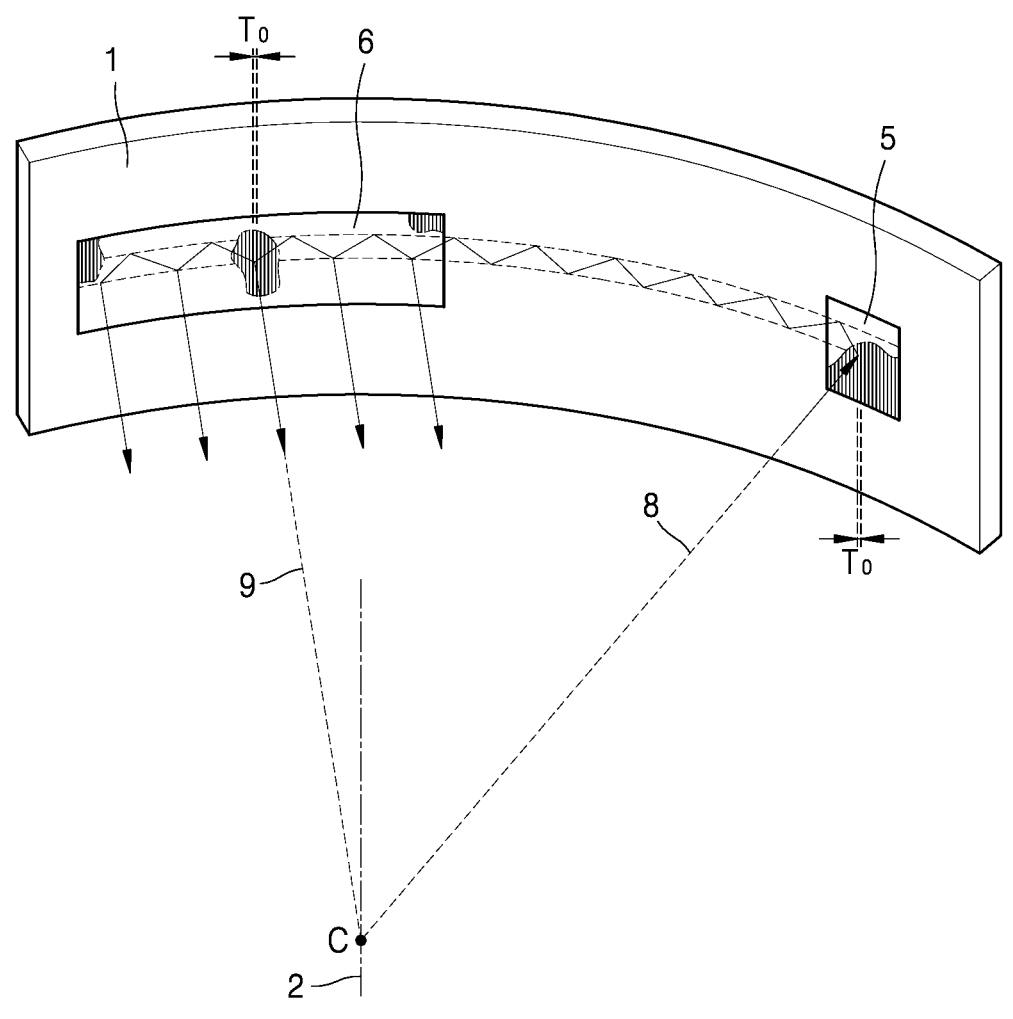
FIG. 5 illustrates an isometric view of ray propagation through a concentric cylindrical waveguide, an in-coupling DOE with a period variation expression according to Expression 1, an out-coupling DOE with a period variation expression according to Expression 2 according to an embodiment of the disclosure.

The period of the out-coupling DOE 6 in the cross-section $X_{out}O_{out}Z_{out}$ should be infinite to form an image (imaging) at infinity, that is, the grooves of the out-coupling DOE 6 are to be parallel to the common axis 2 of the cylindrical surfaces of the curved waveguide, as shown in FIG. 5, wherein this is a mandatory requirement for imaging at infinity.

FIG. 5 illustrates an isometric view of ray propagation through a concentric cylindrical waveguide, an in-coupling DOE with a period variation expression according to Expression 1, an out-coupling DOE with a period variation expression according to Expression 2 according to an embodiment of the disclosure.

Referring to FIG. 5, in the case of using the above period variation expressions for the in-coupling DOE 5 (Expression 1) and the out-coupling DOE 6 (Expression 2) the ray that incident at the center $O_{in}$ of the in-coupling DOE 5 along the normal 8 to the surface of the waveguide 1 will emerge at the center $O_{out}$ of the out-coupling DOE 6 also along the normal 9 to the surface of the waveguide 1 at this point because the periods of the in-coupling and out-coupling DOEs at these points are the same and equal to $T_0$. It should be emphasized that the Expression 1 provides input of a parallel beam into the curved waveguide, and the Expression 2 provides output of an aberration-free parallel beam, and the equality of $T_0$ at the central points of the in-coupling DOE and the out-coupling DOE provides output of a parallel beam incident in the direction of the normal in the center of the in-coupling DOE, in the direction of the normal in the center of the out-coupling DOE. The Expressions 1and 2 are derived from the diffraction grating formula and geometry. Having positioned the projector axis on the normal 8 to the surface of the waveguide 1 in the center of the in-coupling DOE 5, the parallel beam of rays formed by the out-coupling DOE 6 will be directed along the normal 9 to the surface of the waveguide 4 in the center of the out-coupling DOE 6, and the user eye motion box will be also symmetrical with respect to the normal 9 to the surface of the waveguide 4 at the center of the out-coupling DOE 6, as shown in FIG. 4. Such a connection between the in-coupling and out-coupling DOEs will provide the symmetry of the concave surface of the waveguide 1a for the rays falling on the in-coupling DOE 5 from the radiation source and for the rays emerging from the out-coupling DOE 6 and forming the eye motion box 7. This will provide minimal off-axis aberrations (coma, astigmatism) and minimal chromatic aberrations (position and magnification chromatism) in the image formed by such a combiner because a symmetrical optical system is known to provide minimal aberrations.

The location of the in-coupling 5 and the out-coupling DOE 6 on the curved waveguide 1 and the orientation of their gratings are schematically shown in FIG. 5.

Referring to FIG. 5, the in-coupling DOE 5 and the out-coupling DOE 6 are located on the concave surface of the curved waveguide 1, the surface having the form of a concentric cylindrical meniscus. The grooves of the diffraction gratings of these DOEs are parallel to the axis 2 of the cylindrical surfaces of the waveguide 1, which is a particular case of making the grooves of the diffraction gratings of the in-coupling and out-coupling DOEs. The ray falling on the center of the in-coupling DOE 5, whose period variation expression corresponds to the Expression 1, undergoes diffraction on the in-coupling DOE 5 in the direction of the normal to the surface of the waveguide 8 and propagates at the TIR angles within the waveguide 1. Having reached the region of the out-coupling DOE 6, whose period variation expression corresponds to the Expression 2, this ray undergoes diffraction at the out-coupling DOE 6 and is output from the waveguide, forming a set of parallel rays. If the period at the center of the out-coupling DOE will be equal to the period on the in-coupling DOE at the point of incidence of a corresponding ray, then the ray fell in the center of the out-coupling DOE 6 will be outputted from the waveguide 1 along direction of the normal 9 to the concave surface of the waveguide and will cross the axis 2 of the cylindrical surfaces of the waveguide 1.

One of important advantages of the proposed combiner based on a curved waveguide made in the form of a concentric cylindrical meniscus is the formation of a high-quality virtual image only from the concave side of such a waveguide. Any out-coupling DOE is known will output a portion of the radiation in the opposite direction from the user eye. In the case of a flat waveguide, the virtual image can be fully or partially observed by an outside observer whose eye is in the direction of such a spurious image. However, in respect of the proposed combiner, such a spurious virtual image will be defocused because it is formed from the concave surface of the waveguide. In everyday use by a user of an augmented reality device with the proposed combiner, including in public places, the impossibility of observing a virtual image for an outside observer is indisputable advantage.

The proposed combiner will provide the user with virtual images of points spatially extended along the vertical axis of an object (parallel to the $O_{in}X_{in}$ axis), without aberrations. However, images of other points spatially extended along the horizontal axis of the object (parallel to the $O_{in}Y_{in}$ axis), such a combiner will form with some aberration.

Let is consider an example of aberration of the in-coupling DOE 5 in the proposed combiner. Let the projector forms an image at infinity, and the field of view of the projector in the plane $Y_{in}O_{in}Z_{in}$ is $\pm12°$, a size of the exit pupil is equal to 4 mm, a distance from the exit pupil of the projector to the in-coupling DOE is equal to 15 mm, a radiation wavelength $\lambda=640$ nm (red color). Let the waveguide thickness be 1 mm and the inner radius R1=150 mm. Let the period of the in-coupling and out-coupling DOEs in the center be $T_0=540$ nm. The scheme of incidence of an arbitrary ray from the exit pupil of the projector on the in-coupling DOE 5 in the plane $Y_{in}O_{in}Z_{in}$ is shown in FIG. 6.

Figure 6:
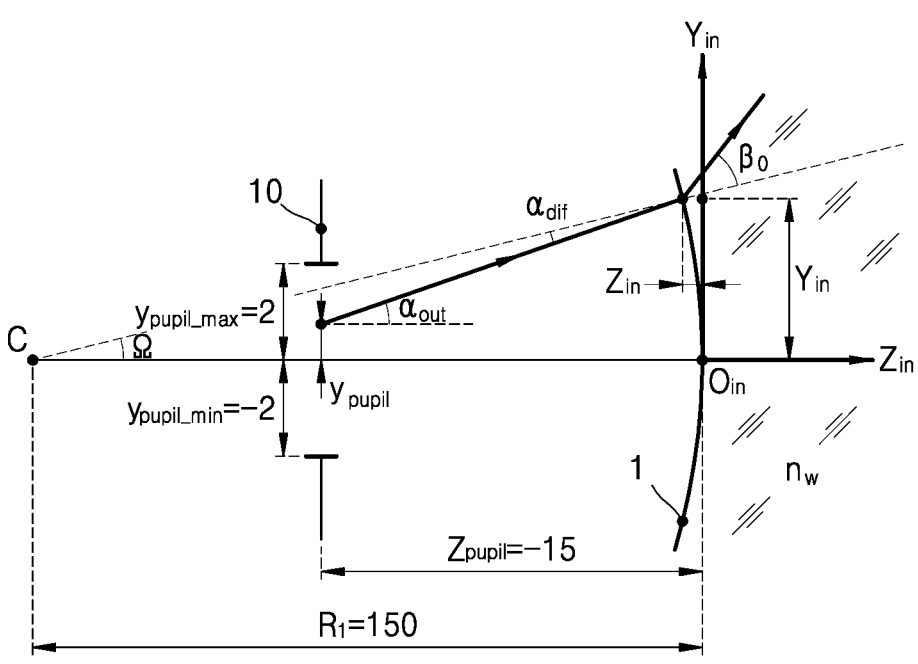
FIG. 6 illustrates a diffraction scheme of ray from a projector with an exit pupil of finite dimensions, which forms an image at infinity, on an in-coupling DOE in a cross-section $Y_{out} O_{out}Z_{out}$ according to an embodiment of the disclosure.

FIG. 6 illustrates a diffraction scheme of ray from a projector with an exit pupil of finite dimensions, which forms an image at infinity, on an in-coupling DOE in a cross-section $Y_{out}O_{out}Z_{out}$ according to an embodiment of the disclosure.

Referring to FIG. 6, a concave surface of the waveguide 1 with the in-coupling DOE (not shown in FIG. 6), an exit pupil 10 of the projector, a center of curvature of the waveguide surfaces, i.e., the point C are denoted.

In order to analyze aberrations of the in-coupling DOE, it is necessary to analyze error of ray input from each point of the exit pupil with the coordinate $y_{pupil}$ and for all directions of the field of view $\alpha_{out}$. With known system parameters, for each such ray, coordinates on the in-coupling DOE $y_{in}$, $z_{in}$, $L_{in}$ and an angle $\alpha_{dif}$ of the ray incidence on the in-coupling DOE relative to the normal can be determined. If the period variation expression at each point of the in-coupling DOE as a function of $L_{in}$ $$T_{YOZ}^{IN}(L_{in}) \qquad \text{(Expression 1)}$$

is known, a ray diffraction angle can be calculated and it can be compared with a nominal diffraction angle at the central point of the in-coupling DOE. Thus, a two-dimensional array of angular errors of the in-coupling DOE as a function of the coordinate $y_{pupil}$ at the exit pupil of the projector and the field of view angle $\alpha_{out}$ can be built-up. The result of such analysis for the selected system parameters and the period variation Expression 1 for the in-coupling DOE is shown in FIG. 7A.

Figure 7A:
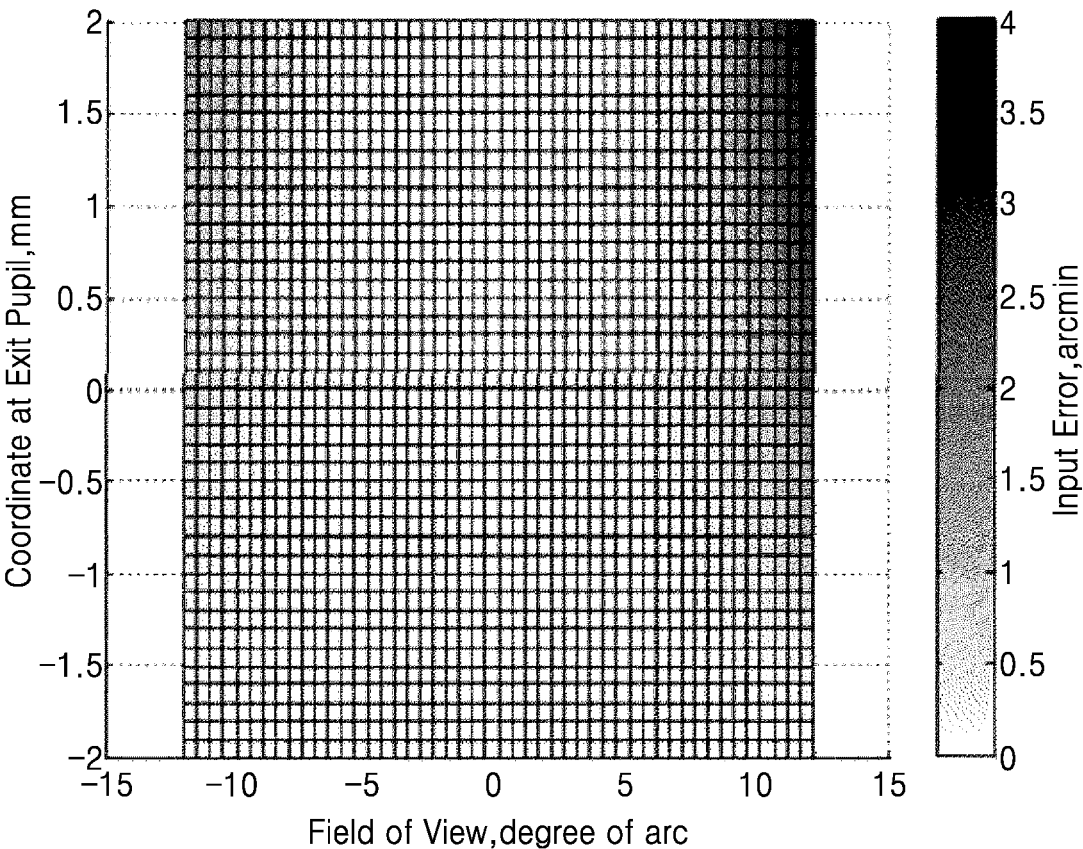
FIGS. 7A and 7B illustrate graphs of angular error distribution of an in-coupling DOE a) with a period variation expression according to Expression 1, b) with a specified period variation expression according to various embodiments of the disclosure.
Figure 7B:
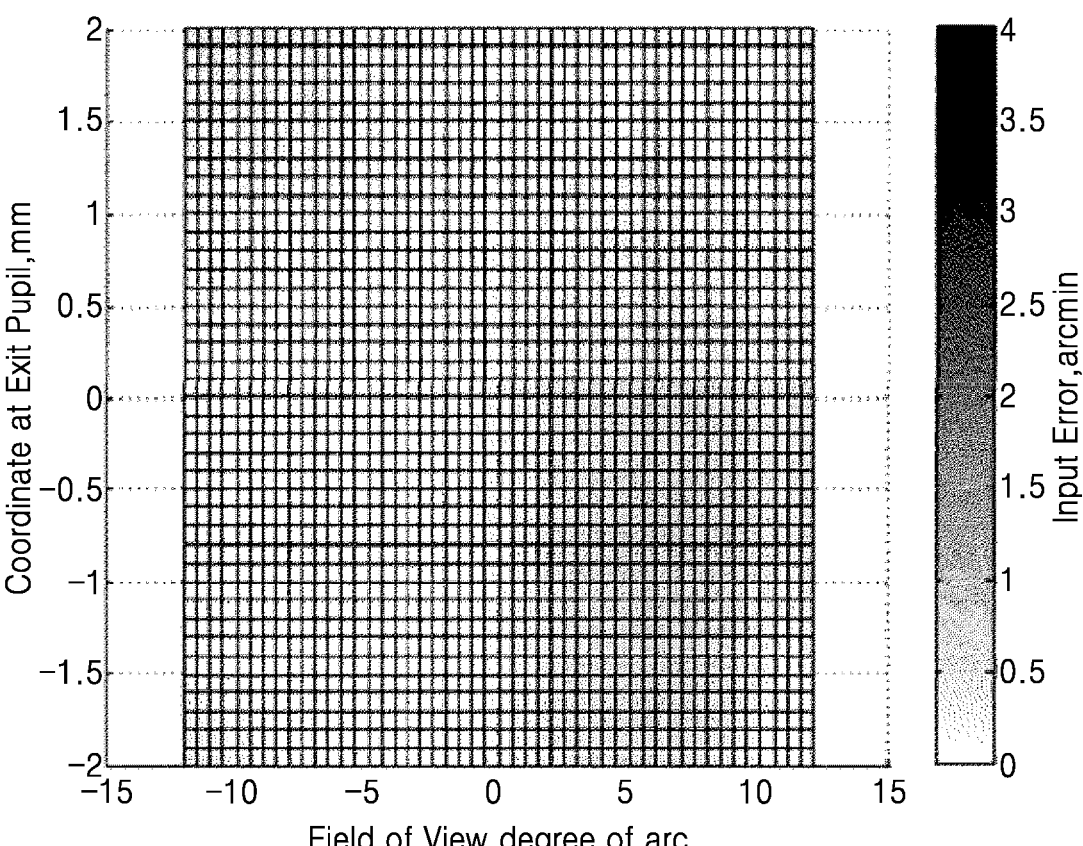

FIGS. 7A and 7B illustrate graphs of angular error distribution of an in-coupling DOE a) with a period variation expression according to Expression 1, b) with a specified period variation expression according to various embodiments of the disclosure.

Referring to FIGS. 7A and 7B, in the region of the field of view $\alpha_{out}=0°$, the error of ray input is zero, that is, the rays from the center of the field of view will be entered without aberrations for any $y_{pupil}$. However, for non-zero directions of the field of view, this error is not equal to zero, and the maximum error value being of about 4 arcmin corresponds to the ray from the upper region of the exit pupil of the projector for the field of view of 12°.

The Expression 1 can be approximated, for example, by a $4^{th}$ order polynomial, to correct the period variation expression for the in-coupling DOE in order to reduce the input error. The coefficients of this polynomial can be selected such that the maximum error of ray input will be several times smaller for all combinations of position angles and coordinates at the exit pupil of the projector. The result of calculating the errors of ray input of such in-coupling DOE is shown in FIG. 7B. In this case, the maximum error is 0.8 arcmin, which is more than 5 times less than the maximum error of the initial in-coupling DOE with the period variation according to the analytical Expression 1.

Let is consider the operation of the out-coupling DOE 6 located on the curved waveguide in the form of a cylindrical concentric meniscus. Let the rays have been input into the waveguide and transmitted through it without distortions and fall on the out-coupling DOE at the point with a coordinate $L_{out}$ at angle $\beta_{in}$. The scheme of ray output in the meridional section is shown in FIG. 8.

Figure 8:
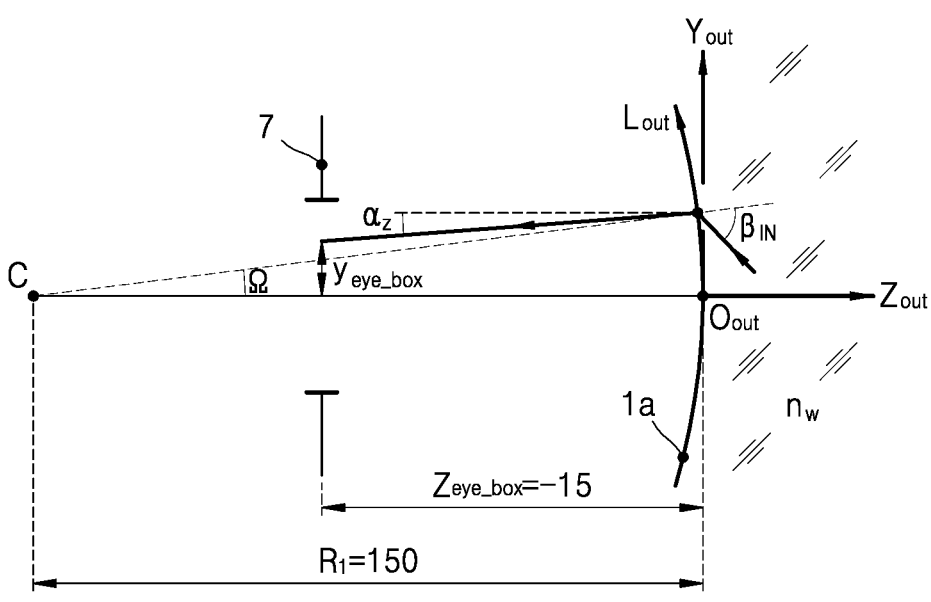
FIG. 8 illustrates a diffraction scheme of ray on an out-coupling DOE in a cross-section $Y_{out} O_{out} Z_{out}$ according to an embodiment of the disclosure.

FIG. 8 illustrates a diffraction scheme of ray on an out-coupling DOE in a cross-section $Y_{out}O_{out}Z_{out}$ according to an embodiment of the disclosure.

Referring to FIG. 8, a concave surface 1a of the waveguide 1 with the out-coupling DOE (not shown in FIG. 8), an eye motion box 7, whose plane is spaced apart at 15 mm from the center of the out-coupling DOE, a center of curvature of the waveguide surfaces, i.e., the point C are denoted.

Figure 9A:
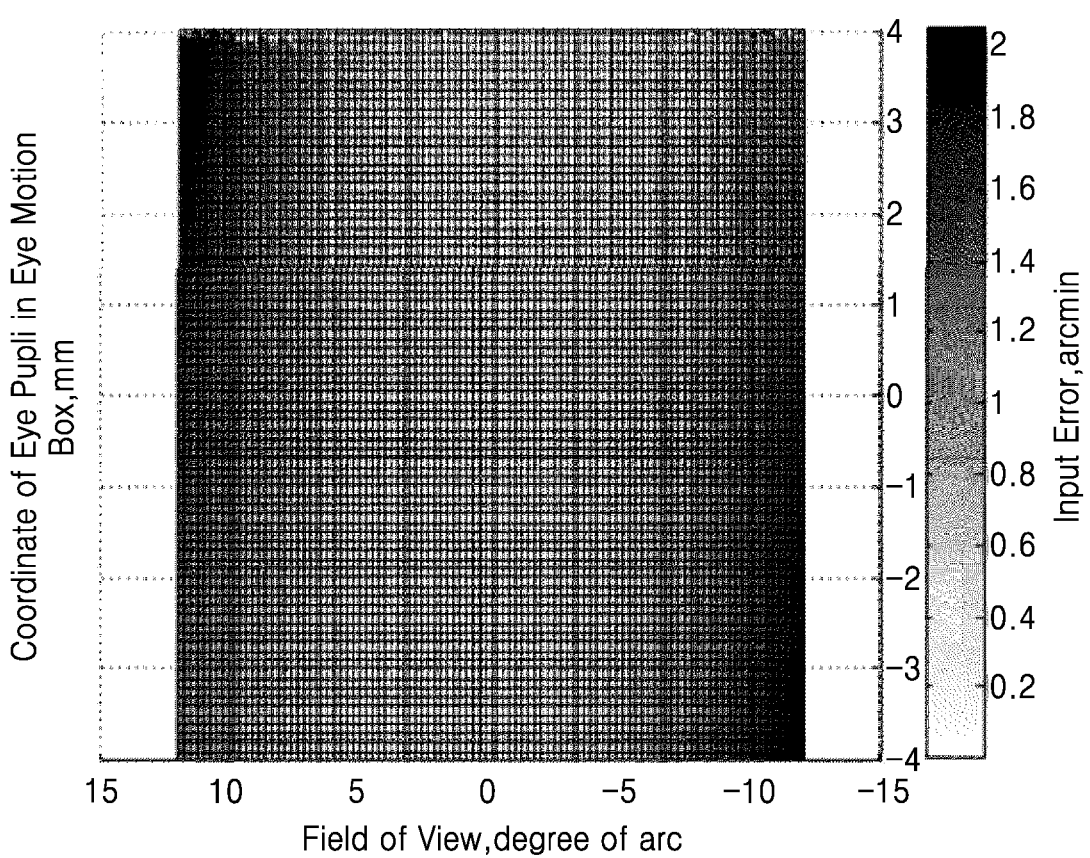
FIGS. 9A and 9B illustrate graphs of angular error distribution of an out-coupling DOE a) with a period variation expression according to Expression 2, b) with a specified period variation expression according to various embodiments of the disclosure.
Figure 9B:
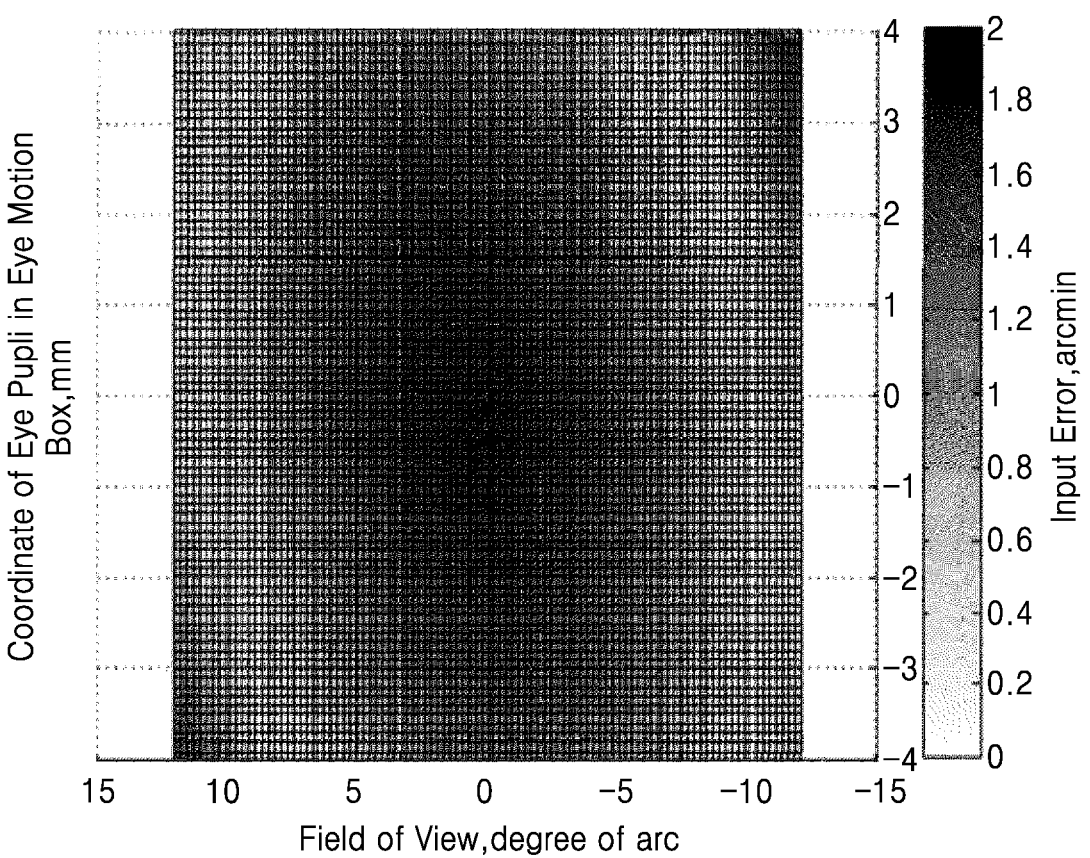

FIGS. 9A and 9B illustrate graphs of angular error distribution of an out-coupling DOE a) with a period variation expression according to Expression 2, b) with a specified period variation expression according to various embodiments of the disclosure.

Referring to FIGS. 9A and 9B, the center of the coordinate system $X_{out}O_{out}Z_{out}$ is located at the center of the out-coupling DOE, and $L_{out}$ is a linear coordinate along the curved surface of the waveguide with the origin also being in the center of the out-coupling DOE, i.e., in the point $O_{out}$. Then the ray that has fallen from the waveguide to the out-coupling DOE will undergo diffraction and leave the waveguide at angle $\alpha_z$, fall on an eye motion plane at a point with a height $y_{eye\_box}$. Thus, a result of operation of the out-coupling DOE can be analyzed by sorting through all possible combinations of the angles $\beta_{in}$ of ray incidence corresponding to the field of view and the linear coordinates $L_{out}$ on the out-coupling DOE and by obtaining a set of the corresponding $\alpha_z$ and $y_{eye\_box}$. Meanwhile, it is necessary to take into account an eye pupil size, which is several times smaller than a size of an eye motion box. To do this, it is necessary to pick over all possible positions of the user eye pupil within the eye motion box and, for each such position, to calculate all the rays falling into such a pupil from one or another direction of the field of view $\beta_{in}$. For a cylindrical waveguide with an inner radius of 150 mm, the out-coupling DOE with the period variation expression according to Expression 2 and with an eye pupil size of 4 mm, the eye motion box of 12 mm, the dependence of the angular error of the formed virtual image with a width of 24° is shown in FIG. 9A. As is seen from this graph, the center of the field is displayed without aberrations for all pupil positions, and when the direction in the field deviates from the center, the error increases, wherein the maximum error for the selected system parameters is around 2 arcmin.

The Expression 2 for the out-coupling DOE can also be corrected in order to reduce the maximum error. The period variation expression is also interpolated by a $4^{th}$ order polynomial, whose coefficients are selected such that for all combinations of the position of the pupil in the eye motion box for different directions of the field of view, the angular error of the rays falling on the user pupil is minimal. The dependence of the angular error of such out-coupling DOE with the specified period variation expression is shown in FIG. 9B. In this case, the maximum angular error was succeeded for reducing to 1.5 arcmin.

As a DOE in the proposed combiner scheme, holographic optical elements recorded on a thin film material can be used. One of the known schemes of an installation for recording holographic optical elements with a variable period, which can be used as an in-coupling or out-coupling DOE for the proposed combiner is shown in FIG. 10.

Figure 10:
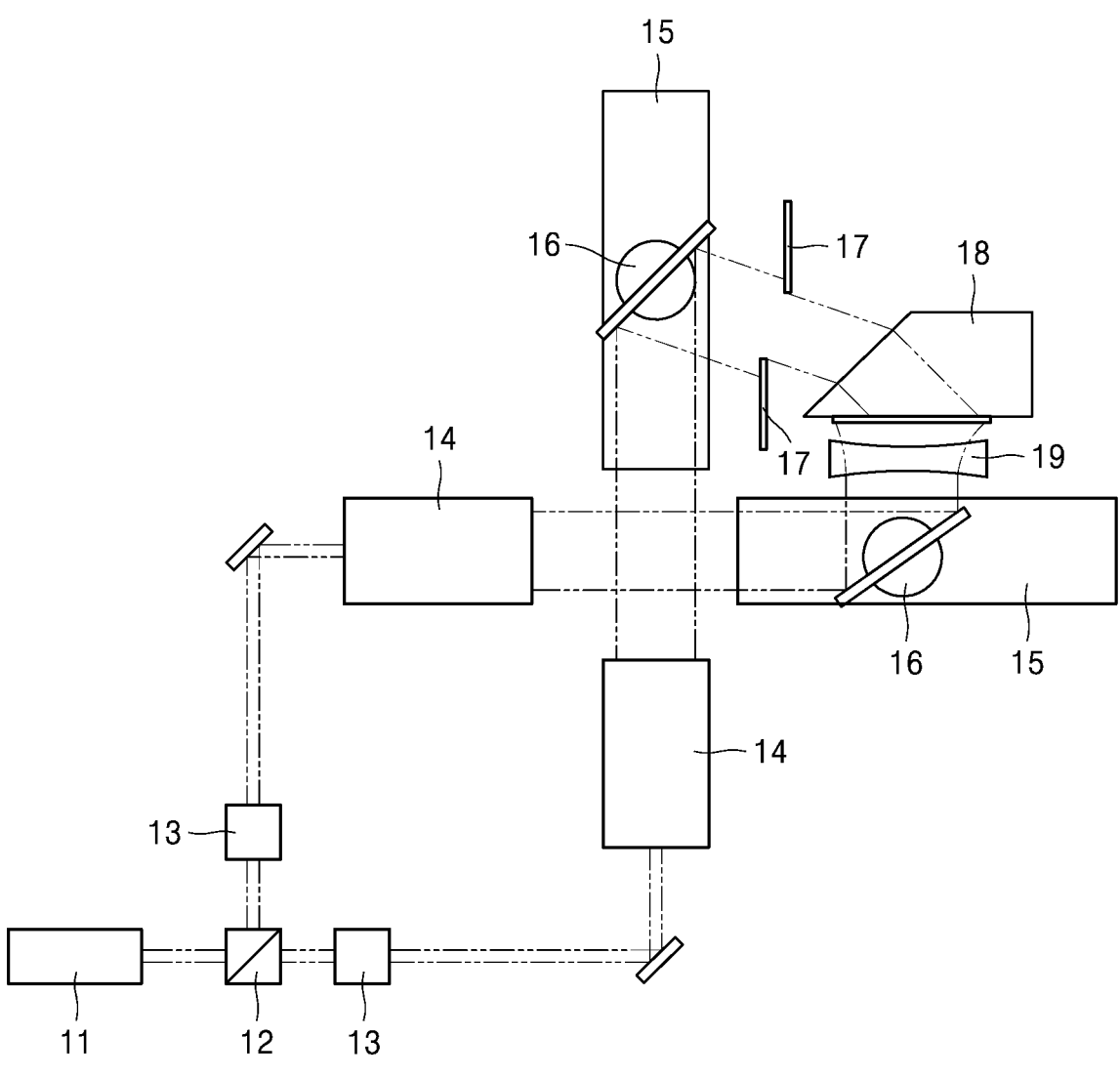
FIG. 10 illustrates a diagram of an installation for recording a DOE (HOE) with a variable period on a film-type holographic material according to an embodiment of the disclosure.

FIG. 10 illustrates a diagram of an installation for recording a DOE (HOE) with a variable period on a film-type holographic material according to an embodiment of the disclosure.

Referring to FIG. 10, a laser radiation source 11, a cubic beam splitter 12, that splits the laser beam into two beams by energy, controlled shutters 13, telescopic systems 14 for increasing the transverse dimensions of the beam, motorized linear translators 15, on the tables of which rotating motorized platforms with flat mirrors 16 are installed, screens 17 limiting the beam to form an element of given dimensions and to exclude flare light within a working prism 18, a cylindrical lens 19 providing modulation of the period of a holographic diffraction grating to be recorded are denoted.

A photosensitive holographic material 20, on which the holographic diffraction grating is recorded, is laminated onto the flat surface of the working prism 18. The axes of the cylindrical surfaces of the lens 19 are oriented perpendicularly to the drawing plane of FIG. 10, thereby the diffraction grating recorded on the photosensitive holographic material is a set of parallel grooves (zones with equal refractive index) also perpendicular to the drawing plane of FIG. 10. The parameters of the cylindrical lens 19, its position relative to the working prism 18, as well as the position and orientation of the mirrors on the rotating motorized platforms 16 are selected such that the period variation expression for an interference pattern in the plane of location of the photosensitive holographic material 20 corresponds to the Expression 1 or 2 or other required expressions for dependence of a variation in the DOE period. In this case the variable $L_{in}$ for the in-coupling DOE and the variable $L_{out}$ for the out-coupling DOE correspond to a linear direct coordinate on the plane of the working prism 18. The photosensitive holographic material 20 is a thin transparent film that can be transferred from the flat surface of the working prism 18 to the curved surface of the cylindrical concentric waveguide. Thus, the curved combiner of the proposed configuration can be manufactured.

Figure 11A:
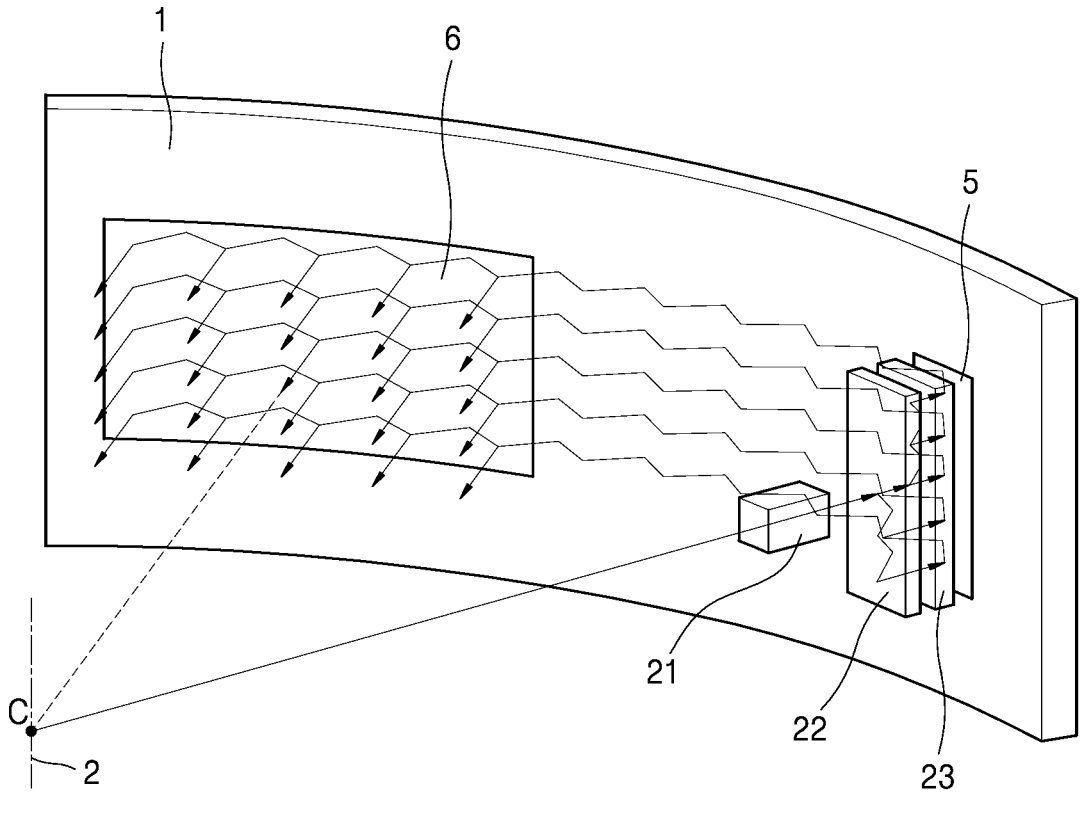
FIGS. 11A and 11B illustrate an isometric view of ray propagation through exit pupil expansion waveguides of a projector and a concentric cylindrical waveguide according to various embodiments of the disclosure.

Referring to FIGS. 4 and 5, in the proposed optical system, the out-coupling DOE 6 forms a horizontally extended eye motion zone 7 due to multiple output of the ray each time it falls on the out-coupling DOE 6 along the ray propagation path within the waveguide 1. In order to form a vertically extended eye motion box, the exit pupil of the projector 21 of FIG. 11A is necessary to be expanded. To do this, when introducing radiation from the projector, two additional flat waveguides 22 and 23 can be used, as shown in FIG. 11B, with DOEs having a constant period of diffraction gratings, and grooves of the diffraction gratings of which are oriented horizontally (perpendicularly to the axis 2 of the cylindrical surfaces of the waveguide 1).

Figure 11B:
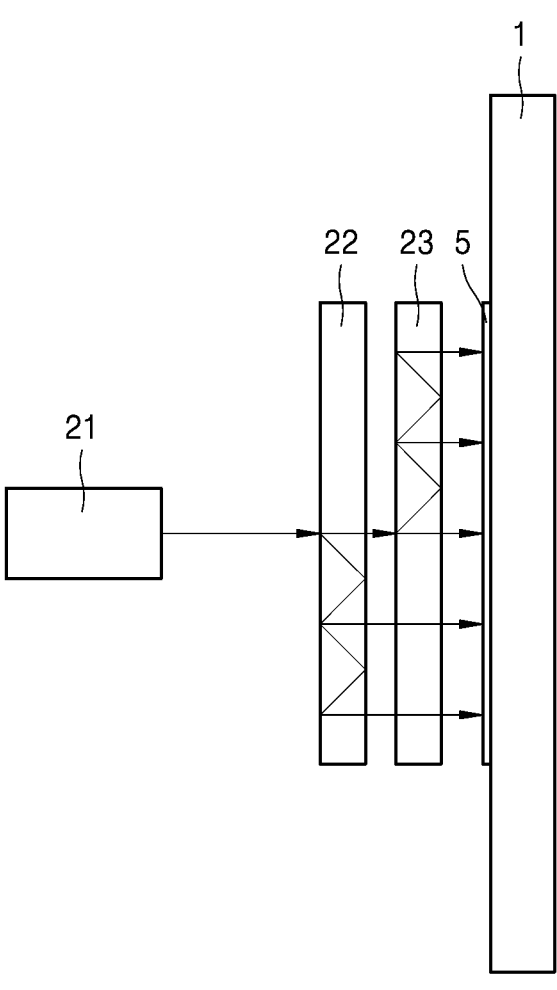

FIG. 11A illustrates a ray path through a curved combiner in isometry according to an embodiment of the disclosure, and FIG. 11B illustrates a vertical cross-section in a region of a projector and an in-coupling DOE according to an embodiment of the disclosure.

Referring to FIGS. 11A and 11B, they explain the principle of operation of such additional flat waveguides that expand the exit pupil of the projector. Two additional flat waveguides 22 and 23, which expand the exit pupil of the projector 21 vertically, are installed between the projector 21 and the in-coupling DOE 5 located on the concave surface of the curved waveguide 1. The flat waveguide 22 with a multiplying DOE expands the exit pupil of the projector down, and the flat waveguide 23 with a multiplying DOE expands the exit pupil of the projector upwards, as shown in FIG. 11B. The beam of rays thus transformed falls from the projector on the in-coupling DOE 5, is introduced into the waveguide 1, propagates within it, and is outputted by the out-coupling DOE 6. Thus, each ray leaving the projector 21 will be multiplied in a two-dimensional region of the eye motion box, similar to that shown in FIG. 11A for one ray of the projector.

Figure 12:
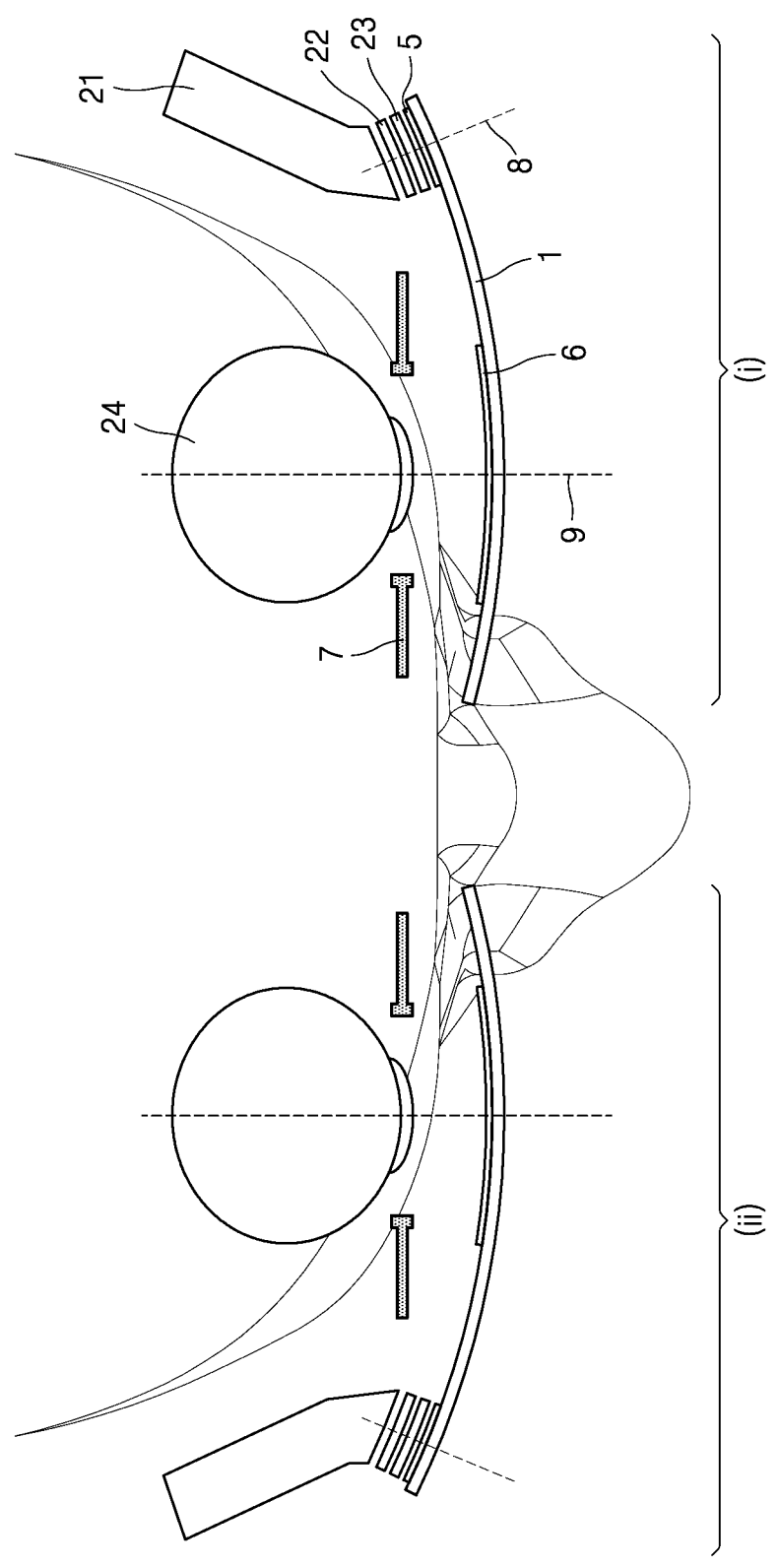
FIG. 12 schematically illustrates a proposed augmented reality device forming a virtual image for two eyes according to an embodiment of the disclosure.

FIG. 12 illustrates a scheme of augmented reality glasses comprising an element for left a) eye and an element for right b) eye of a user according to an embodiment of the disclosure. Each of the elements for left and right eye is the augmented reality display device described above.

Referring to FIG. 12, a curved waveguide 1, on the surface of which the in-coupling DOE 5 and out-coupling DOE 6 are located, a user eye motion box 7, a projector 21 forming a virtual image at infinity, flat waveguides 22 and 23 for expanding the exit pupil of the microprojector 21 vertically, user eye 24 are denoted.

The center of the eye motion box 7, where the user eye 24 is supposedly located, is disposed on the axis 9 coinciding with the normal to the surface of the waveguide 1 at the center of the out-coupling DOE 6, as shown in FIG. 12. The rays constituting the image output by the projector 21 are directed at angle of 20°-40° with respect to the projector body 21, as shown in FIG. 12, which can be achieved by introducing prisms or mirrors into the optical scheme of the microprojector. The most comfortable option for the user will be such arrangement of the elements for left and right eye, in which the distance between the center of the out-coupling DOE 6 of the element for right eye and the center of the out-coupling DOE 6 element for left eye corresponds to the interpupillary distance of the user, and also when the normal to the waveguide surface in the center of the out-coupling diffractive optical element for right eye is parallel to the normal to the waveguide surface in the center of the out-coupling diffractive optical element for left eye.

A distortion-free sharp image of augmented reality can be formed due to the disclosure.

The proposed arrangement of the augmented reality device with the curved combiner will permit making it compact and similar in appearance to user traditional sunglasses or glasses for vision correction. Such device, due to its compactness and wearing comfort, can be used continuously all day long, which will allow the user to be in information environment formed personally for him(her) using means, such as social networks, media, messaging programs, information search tools processing user queries, including on elements from the user surrounding real world.

According to the augmented reality display device according to an embodiment of the disclosure, the augmented reality display device may include a projector forming an initial image.

The augmented reality display device may include a curved waveguide having a shape of a concentric cylindrical meniscus and comprising an in-coupling diffractive optical element and an out-coupling diffractive optical element.

According to the augmented reality display device according to an embodiment of the disclosure, a grating period of the in-coupling diffractive optical element at each point of the in-coupling diffractive optical element may be such that rays emanating from one point of the initial image undergo diffraction at the in-coupling diffractive optical element at a same angle relative to a normal to a surface of the curved waveguide at a point of incidence.

According to the augmented reality display device according to an embodiment of the disclosure, the curved waveguide may be configured to propagate rays of the initial image from the in-coupling diffractive optical element to the out-coupling diffractive optical element based on total internal reflection from surfaces of the curved waveguide, wherein, when propagating the rays of the initial image, angles of incidence on and of reflection from a concave surface of the curved waveguide inside the curved waveguide are equal to each other and constant, and angles of incidence on and of reflection from a convex surface of the curved waveguide inside the curved waveguide are equal to each other and constant.

According to the augmented reality display device according to an embodiment of the disclosure, the out-coupling diffractive optical element may be configured to form a virtual image on a user retina by converting the rays passed through the curved waveguide and falling on the out-coupling diffractive optical element into parallel beams of rays.

According to the augmented reality display device according to an embodiment of the disclosure, at least at one point on each of diffractive optical elements, a diffraction grating period of the in-coupling diffractive optical element may be equal to a diffraction grating period of the out-coupling diffractive optical element.

According to the augmented reality display device according to an embodiment of the disclosure, the diffraction grating period of the in-coupling diffractive optical element may be equal to the diffraction grating period of the out-coupling diffractive optical element in a center of the in-coupling diffractive optical element and in the center of the diffraction grating of the out-coupling diffractive optical element.

According to the augmented reality display device according to an embodiment of the disclosure, the center of the initial image may lie on the normal to a waveguide surface in the center of the in-coupling diffractive optical element, and the center of an image formed by the out-coupling diffractive optical element lies on the normal to the waveguide surface in the center of the out-coupling diffractive optical element.

According to the augmented reality display device according to an embodiment of the disclosure, if the projector forms an image at infinity, for each point of the in-coupling diffractive optical element with coordinates $x_{in}$ and $L_{in}$ its period is defined by an expression:

$$T^{IN}(x_{in}, L_{in}) = \frac{\lambda}{\sin\left(\dfrac{L_{in}}{R1}\right) + \dfrac{\lambda}{T_0}},$$

xin is a linear coordinate of the point on the waveguide surface on which the ray falls along an OinXin axis in a coordinate system OinXinYinZin, wherein a center Oin of a coordinate system is disposed at the center of the in-coupling diffractive optical element, a Zin axis is directed along the normal to the surface of the curved waveguide, a Yin axis is directed tangentially to the surface of the curved waveguide in a point Oin along a length of the curved waveguide and perpendicularly to the Zin axis, an Xin axis is directed along a generatrix of a cylindrical surface of the curved waveguide in the point Oin across a width of the curved waveguide and perpendicularly to the Zin axis;

Lin is a linear coordinate along the concave surface of the curved waveguide with an origin in the center Oin of the in-coupling diffractive optical element, R1 is a curvature radius of the concave surface of the curved waveguide, $\lambda$ is an incident radiation wavelength, T0 is a diffraction grating period of the in-coupling diffractive optical element in the point where ray with a wavelength $\lambda$ falling on the in-coupling diffractive optical element along the normal to the surface of the curved waveguide undergoes diffraction into a $-1^{st}$ diffraction order by the in-coupling diffractive optical element.

According to the augmented reality display device according to an embodiment of the disclosure, grating grooves of the in-coupling diffractive optical element may be parallel to a common axis of the cylindrical surface of the curved waveguide.

According to the augmented reality display device according to an embodiment of the disclosure, if the out-coupling diffractive optical element forms an image at infinity, a variation of a period of the out-coupling diffractive optical element is equal to:

$$T^{OUT}_{YOZ}(L_{out}) = \frac{\lambda}{\dots \sin\left(L_{out}/R1\right) + \lambda/T_0},$$

Lout is a linear coordinate along the concave surface of the curved waveguide in a cross-section YoutOoutZout with an origin in a center Oout of the out-coupling diffractive optical element, where the period of the out-coupling diffractive optical element is equal to T0, a Zout axis is directed along the normal to the surface of the curved waveguide, a Yout axis is directed tangentially to the surface of the curved waveguide in a point Oout along a length of the curved waveguide and perpendicularly to the Zout axis, an Xout axis is directed tangentially to the surface of the curved waveguide in the point Oout across a width of the curved waveguide and perpendicularly to the Zout axis, R1 is a curvature radius of the concave surface of the curved waveguide, $\lambda$ is an incident radiation wavelength.

According to the augmented reality display device according to an embodiment of the disclosure, grating grooves of the out-coupling diffractive optical element may be parallel to a common axis of the cylindrical surface of the curved waveguide.

According to the augmented reality display device according to an embodiment of the disclosure, the augmented reality display device may include two flat waveguides disposed between the projector and the in-coupling diffractive optical element.

According to the augmented reality display device according to an embodiment of the disclosure, each of the flat waveguides may have a constant-period diffraction grating of the flat waveguide.

According to the augmented reality display device according to an embodiment of the disclosure, grooves of the diffraction grating of each flat waveguide may be perpendicular to an axis of the cylindrical surface of the curved waveguide.

According to the method of operating an augmented reality device according to an embodiment of the disclosure, the method may include forming, by a projector, an initial image.

According to the method of operating an augmented reality device according to an embodiment of the disclosure, the method may include inputting, by an in-coupling diffractive optical element, rays of the initial image into a curved waveguide.

According to the method of operating an augmented reality device according to an embodiment of the disclosure, rays emanating from one point of the initial image may undergo diffraction at the in-coupling diffractive optical element at a same angle relative to a normal to a surface of the curved waveguide at a point of incidence.

According to the method of operating an augmented reality device according to an embodiment of the disclosure, the rays inputted into the curved waveguide may propagate within the curved waveguide based on total internal reflection from surfaces of the curved waveguide.

According to the method of operating an augmented reality device according to an embodiment of the disclosure, the method may include transforming, based on an out-coupling diffractive optical element, the rays passed through the curved waveguide into parallel beams of rays to form a virtual image on a user retina.

According to the method of operating an augmented reality device according to an embodiment of the disclosure, the augmented reality device may include augmented reality glasses comprising an element for left eye and an element for right eye.

According to the method of operating an augmented reality device according to an embodiment of the disclosure, each of the elements for left and right eye may be an augmented reality display device.

According to the method of operating an augmented reality device according to an embodiment of the disclosure, a distance between centers of an out-coupling diffractive optical elements may correspond to a user interpupillary distance.

According to the method of operating an augmented reality device according to an embodiment of the disclosure, the normal to a waveguide surface in a center of the out-coupling diffractive optical element for right eye may be parallel to the normal to the waveguide surface in the center of the out-coupling diffractive optical element for left eye.

According to the method of operating an augmented reality device according to an embodiment of the disclosure, at least at one point on each of diffractive optical elements, a diffraction grating period of the in-coupling diffractive optical element may be equal to a diffraction grating period of the out-coupling diffractive optical element.

According to the method of operating an augmented reality device according to an embodiment of the disclosure, the diffraction grating period of the in-coupling diffractive optical element may be equal to the diffraction grating period of the out-coupling diffractive optical element in the center of the in-coupling diffractive optical element and in the center of the diffraction grating of the out-coupling diffractive optical element.

According to the method of operating an augmented reality device according to an embodiment of the disclosure, the center of the initial image may lie on the normal to the waveguide surface in the center of the in-coupling diffractive optical element, and the center of an image formed by the out-coupling diffractive optical element lies on the normal to the waveguide surface in the center of the out-coupling diffractive optical element.

Although the disclosure has been described with some illustrative embodiments, it should be understood that the disclosure essence is not limited to these specific embodiments. On the contrary, the disclosure essence is intended to include all alternatives, corrections, and equivalents that can be included within the spirit and scope of the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An augmented reality display device comprising a projector forming an initial image; and
a curved waveguide having a shape of a concentric cylindrical meniscus and comprising an in-coupling diffractive optical element and an out-coupling diffractive optical element,
wherein a grating period of the in-coupling diffractive optical element at each point of the in-coupling diffractive optical element is such that rays emanating from one point of the initial image undergo diffraction at the in-coupling diffractive optical element at a same angle relative to a normal to a surface of the curved waveguide at a point of incidence, and
wherein, when a point radiation source corresponding to the one point of the initial image is located at a finite distance $Z_{LGT}$ from a concave surface of the curved waveguide, the grating period of the in-coupling diffractive optical element in the cross-section under consideration is defined by an expression:

$$T_{YOZ}^{OUT}(L_{out}) = \frac{\lambda}{\ldots \sin\left(L_{out}/R1\right) + \lambda/T_0},$$

where Lin is a linear coordinate along a concave surface of the curved waveguide with an origin in the center of the in-coupling diffractive optical element,
R1 is a curvature radius of the concave surface of the curved waveguide,
$\lambda$ is an incident radiation wavelength corresponding to the initial image, and
$T_o$ is a diffraction grating period of the in-coupling diffractive optical element in the point where ray with a wavelength $\lambda$ falling on the in-coupling diffractive optical element along the normal to the surface of the curved waveguide undergoes diffraction into a −1st diffraction order by the in-coupling diffractive optical element.

2. The device of claim 1,
wherein the curved waveguide is configured to propagate rays of the initial image from the in-coupling diffractive optical element to the out-coupling diffractive optical element based on total internal reflection from surfaces of the curved waveguide,
wherein, when propagating the rays of the initial image, angles of incidence on and of reflection from a concave surface of the curved waveguide inside the curved waveguide are equal to each other and constant, and angles of incidence on and of reflection from a convex surface of the curved waveguide inside the curved waveguide are equal to each other and constant.

3. The device of claim 1, wherein the out-coupling diffractive optical element is configured to form a virtual image on a user retina by converting the rays passed through the curved waveguide and falling on the out-coupling diffractive optical element into parallel beams of rays.

4. The device of claim 1, wherein at least at one point on each of diffractive optical elements, a diffraction grating period of the in-coupling diffractive optical element is equal to a diffraction grating period of the out-coupling diffractive optical element.

5. The device of claim 4, wherein the diffraction grating period of the in-coupling diffractive optical element is equal to the diffraction grating period of the out-coupling diffractive optical element in a center of the in-coupling diffractive optical element and in the center of the diffraction grating of the out-coupling diffractive optical element.

6. The device of claim 5, wherein the center of the initial image lies on the normal to a waveguide surface in the center of the in-coupling diffractive optical element, and the center of an image formed by the out-coupling diffractive optical element lies on the normal to the waveguide surface in the center of the out-coupling diffractive optical element.

7. The device of claim 5,
wherein, when the projector forms an image at infinity, for each point of the in-coupling diffractive optical element with coordinates $x_{in}$ and $L_{in}$ its period is defined by an expression:

$$T^{IN}(x_{in}, L_{in}) = \frac{\lambda}{\sin\left(\frac{L_{in}}{R1}\right) + \frac{\lambda}{T_0}},$$

xin is a linear coordinate of the point on the waveguide surface on which the ray falls along an OinXin axis in a coordinate system OinXinYinZin,
wherein a center Oin of a coordinate system is disposed at the center of the in-coupling diffractive optical element, a Zin axis is directed along the normal to the surface of the curved waveguide, a Yin axis is directed tangentially to the surface of the curved waveguide in a point Oin along a length of the curved waveguide and perpendicularly to the Zin axis, an Xin axis is directed along a generatrix of a cylindrical surface of the curved waveguide in the point Oin across a width of the curved waveguide and perpendicularly to the Zin axis;
Lin is a linear coordinate along the concave surface of the curved waveguide with an origin in the center Oin of the in-coupling diffractive optical element,

R1 is a curvature radius of the concave surface of the curved waveguide, $\lambda$ is an incident radiation wavelength corresponding to the initial image, T0 is a diffraction grating period of the in-coupling diffractive optical element in the point where ray with a wavelength $\lambda$ falling on the in-coupling diffractive optical element along the normal to the surface of the curved waveguide undergoes diffraction into a −1st diffraction order by the in-coupling diffractive optical element, and wherein grating grooves of the in-coupling diffractive optical element are parallel to a common axis of the cylindrical surface of the curved waveguide.

8. The device of claim 1, wherein, when the out-coupling diffractive optical element forms an image at infinity, a variation of a period of the out-coupling diffractive optical element is equal to:

$$T_{YOZ}^{OUT}(L_{out}) = \frac{\lambda}{-\sin(L_{out}/R1) + \lambda/T_0},$$

Lout is a linear coordinate along the concave surface of the curved waveguide in a cross-section YoutOoutZout with an origin in a center Oout of the out-coupling diffractive optical element, where the period of the out-coupling diffractive optical element is equal to T0, a Zout axis is directed along the normal to the surface of the curved waveguide, a Yout axis is directed tangentially to the surface of the curved waveguide in a point Oout along a length of the curved waveguide and perpendicularly to the Zout axis, an Xout axis is directed tangentially to the surface of the curved waveguide in the point Oout across a width of the curved waveguide and perpendicularly to the Zout axis, R1 is a curvature radius of the concave surface of the curved waveguide, $\lambda$ is an incident radiation wavelength corresponding to the initial image, and wherein grating grooves of the out-coupling diffractive optical element are parallel to a common axis of the cylindrical surface of the curved waveguide.

9. The device of claim 1, further comprising:

two flat waveguides disposed between the projector and the in-coupling diffractive optical element, wherein each of the flat waveguides has a constant-period diffraction grating of the flat waveguide, and wherein grooves of the diffraction grating of each flat waveguide are perpendicular to an axis of the cylindrical surface of the curved waveguide.

10. A method of operating an augmented reality device, the method comprising:

forming, by a projector, an initial image; and inputting, by an in-coupling diffractive optical element, rays of the initial image into a curved waveguide, wherein rays emanating from one point of the initial image undergo diffraction at the in-coupling diffractive optical element at a same angle relative to a normal to a surface of the curved waveguide at a point of incidence, wherein the rays inputted into the curved waveguide propagate within the curved waveguide based on total internal reflection from surfaces of the curved waveguide; and

transforming, based on an out-coupling diffractive optical element, the rays passed through the curved waveguide into parallel beams of rays to form a virtual image on a user retina, wherein, when a point radiation source corresponding to the one point of the initial image is located at a finite distance $Z_{LGT}$ from a concave surface of the curved waveguide, the grating period of the in-coupling diffractive optical element in the cross-section under consideration is defined by an expression:

$$T_{TOZ}^{IN}(L_{in}) = \frac{\lambda}{\sin\left(\tan^{-1}\left(\frac{R1 \cdot \sin(L_{in}/R1)}{Z_{LGT} - R1 \cdot \cos(L_{in}/R1) + R1}\right) + \frac{L_{in}}{R1}\right) + \frac{\lambda}{T_0}}.$$

where Lin is a linear coordinate along a concave surface of the curved waveguide with an origin in the center of the in-coupling diffractive optical element, R1 is a curvature radius of the concave surface of the curved waveguide, $\lambda$ is an incident radiation wavelength corresponding to the initial image, and $T_o$ is a diffraction grating period of the in-coupling diffractive optical element in the point where ray with a wavelength $\lambda$ falling on the in-coupling diffractive optical element along the normal to the surface of the curved waveguide undergoes diffraction into a −1st diffraction order by the in-coupling diffractive optical element.

11. The method of claim 10, wherein the augmented reality device includes augmented reality glasses comprising an element for left eye and an element for right eye, and wherein each of the elements for left and right eye is an augmented reality display device.

12. The method of claim 11, wherein a distance between centers of an out-coupling diffractive optical elements corresponds to a user interpupillary distance.

13. The method of claim 11, wherein the normal to a waveguide surface in a center of the out-coupling diffractive optical element for right eye is parallel to the normal to the waveguide surface in the center of the out-coupling diffractive optical element for left eye.

14. The method of claim 11, wherein at least at one point on each of diffractive optical elements, a diffraction grating period of the in-coupling diffractive optical element is equal to a diffraction grating period of the out-coupling diffractive optical element.

15. The method of claim 14, wherein the diffraction grating period of the in-coupling diffractive optical element is equal to the diffraction grating period of the out-coupling diffractive optical element in the center of the in-coupling diffractive optical element and in the center of the diffraction grating of the out-coupling diffractive optical element, and wherein the center of the initial image lies on the normal to the waveguide surface in the center of the in-coupling diffractive optical element, and the center of an image formed by the out-coupling diffractive optical element lies on the normal to the waveguide surface in the center of the out-coupling diffractive optical element.

* * * * *